United States Patent [19]
Ito et al.

[11] Patent Number: 5,404,357
[45] Date of Patent: Apr. 4, 1995

[54] INFORMATION WRITING AND READING APPARATUS

[75] Inventors: Motoshi Ito, Moriguchi; Yoshihisa Fukushima, Osaka, both of Japan

[73] Assignee: Matsushita Electric Industrial Co., Ltd., Osaka, Japan

[21] Appl. No.: 905,875

[22] Filed: Jun. 29, 1992

[30] Foreign Application Priority Data

Jun. 27, 1991 [JP] Japan .................................. 3-156463

[51] Int. Cl.6 .............................................. G11B 7/00
[52] U.S. Cl. .................................. 371/21.2; 371/10.2; 369/44.27
[58] Field of Search ................ 371/10.2, 21.2; 369/54, 369/47–49, 58

[56] References Cited

U.S. PATENT DOCUMENTS 5,075,804 12/1991 Deyring .................................. 360/49
5,233,584 8/1993 Kulakowski et al. .................. 369/44
5,235,585 8/1993 Bish et al. ............................. 369/54

Primary Examiner—Vincent P. Canney
Attorney, Agent, or Firm—Ratner & Prestia

[57] ABSTRACT

An information writing and reading apparatus for writing and reading data on a recording disk has a plurality of rewritable sectors for storing normal data and a plurality of DMA sectors for storing defect management data repeatedly in a plurality of DMAs (Defect Management Areas). The information writing and reading apparatus includes DMA register for storing condition data representing the condition of the DMA sectors, erasing device for erasing data in the recording disk by a sector, and a controller for controlling such that after one DMA sector is erased by the erasing device, a condition of the DMA sector is examined whether it is a defectless sector or a defect sector, and a flag representing the examined result is stored in the DMA register.

17 Claims, 27 Drawing Sheets

NOTE: "O" indicates a good sector and "1" indicates a bad sector.

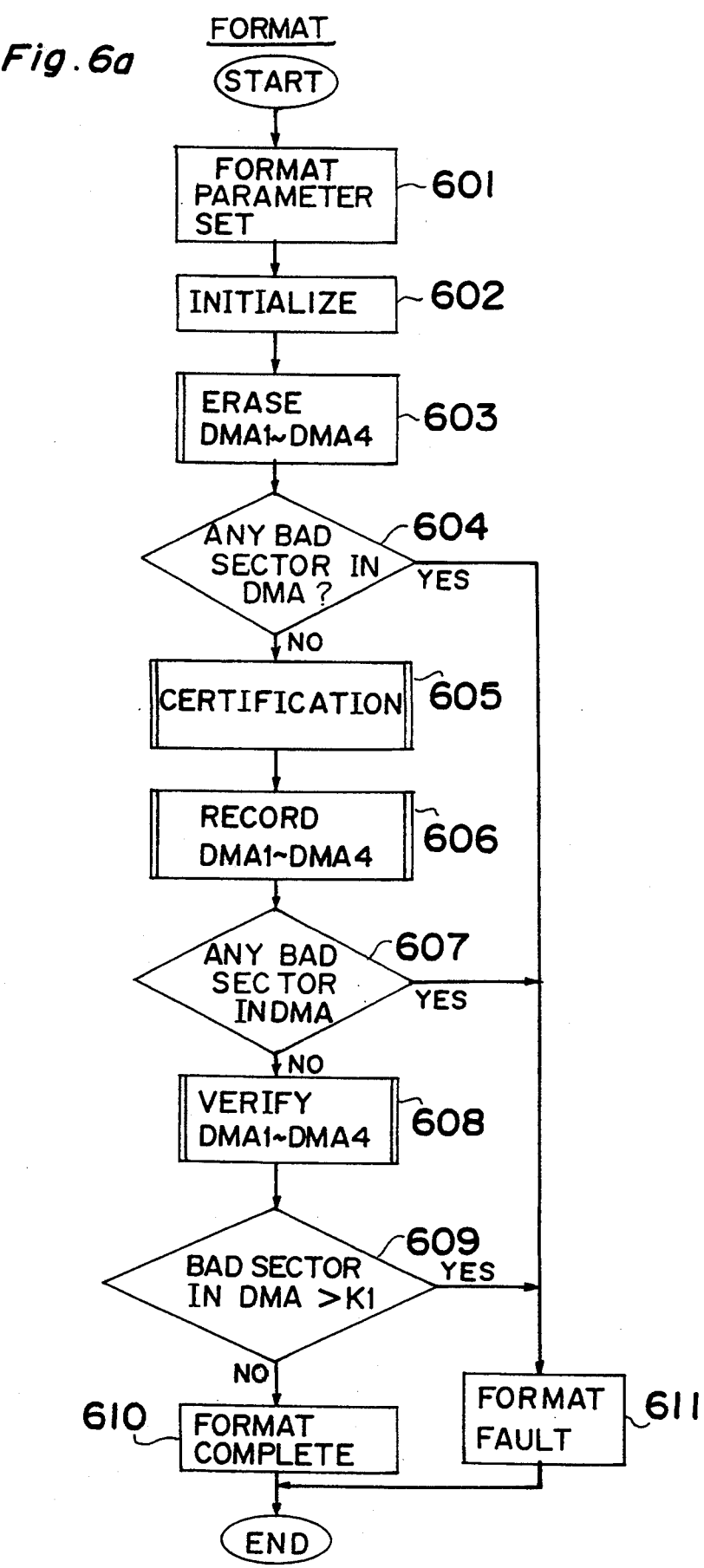

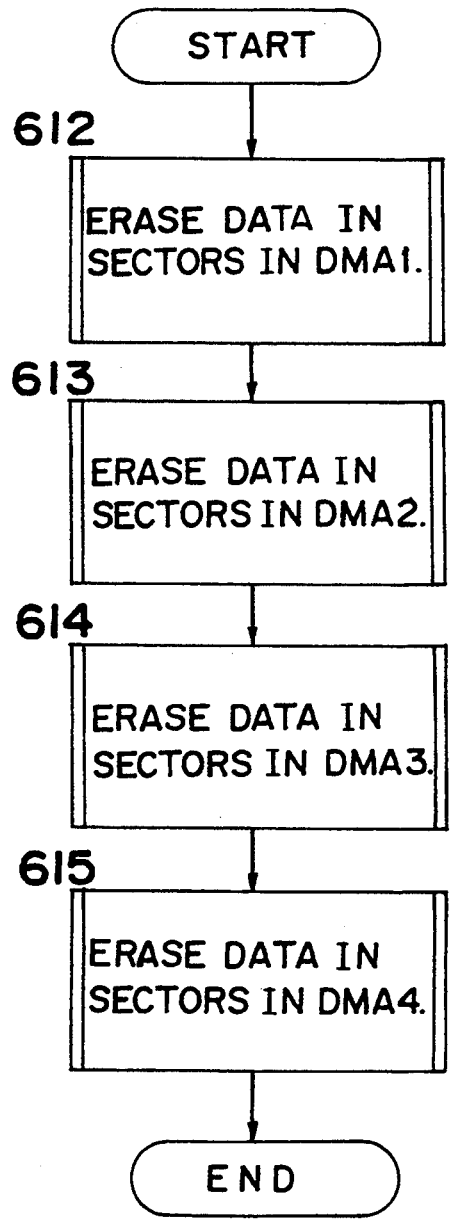

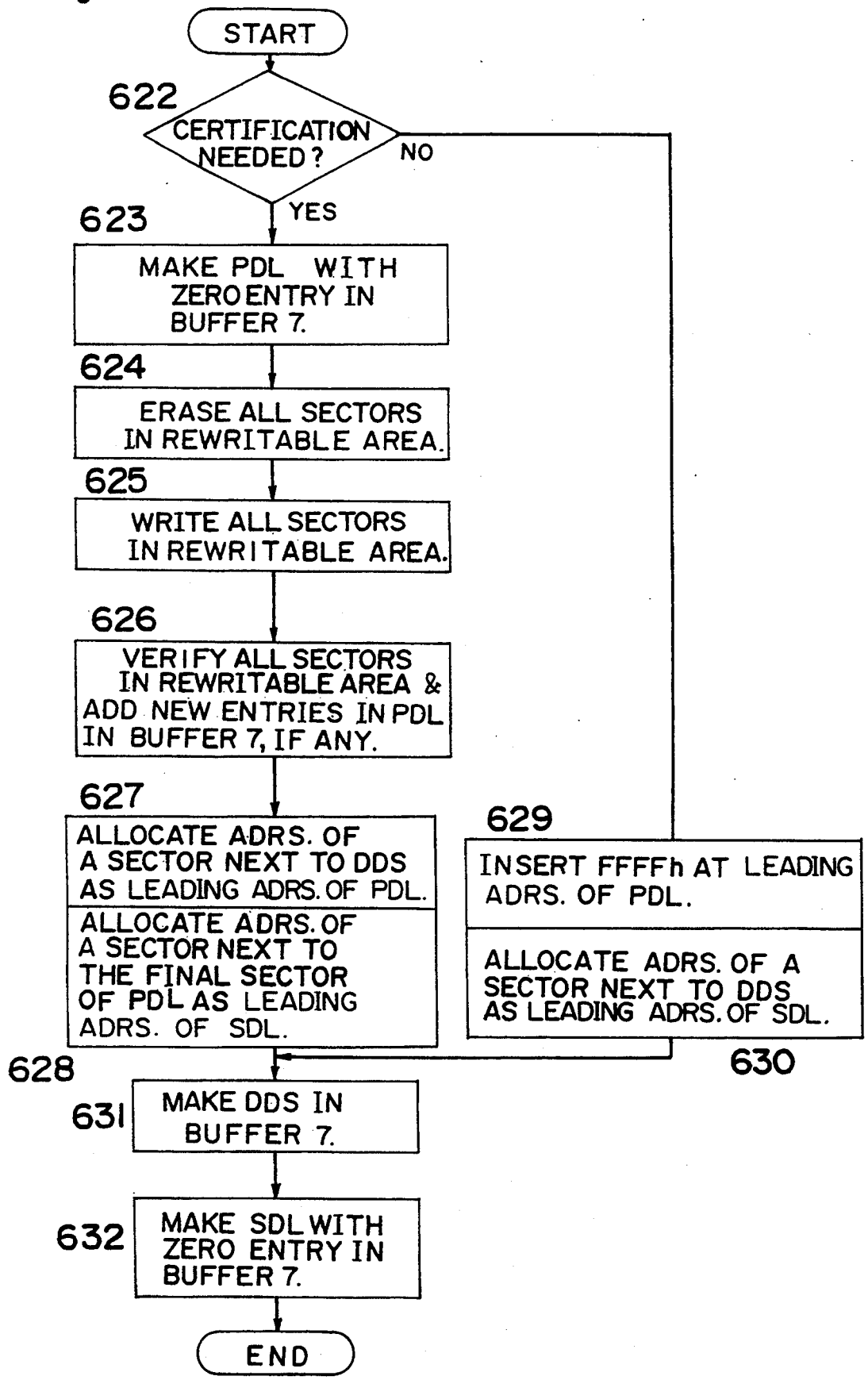

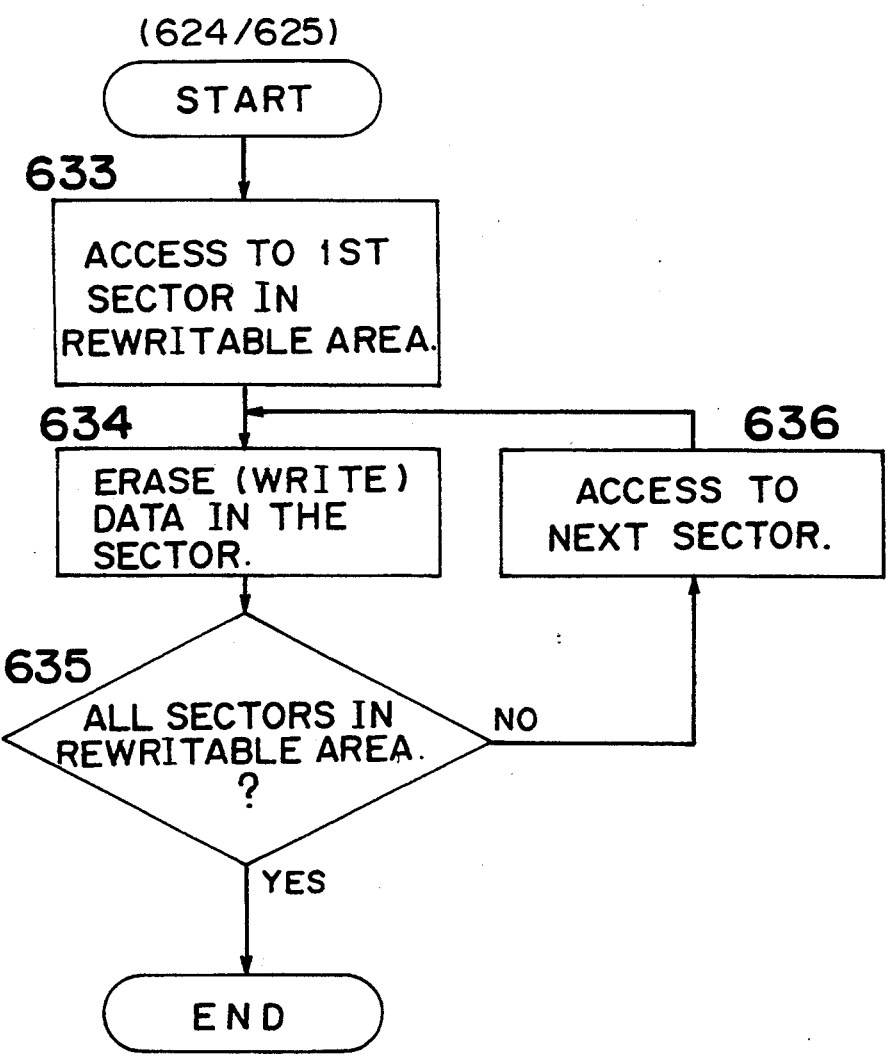

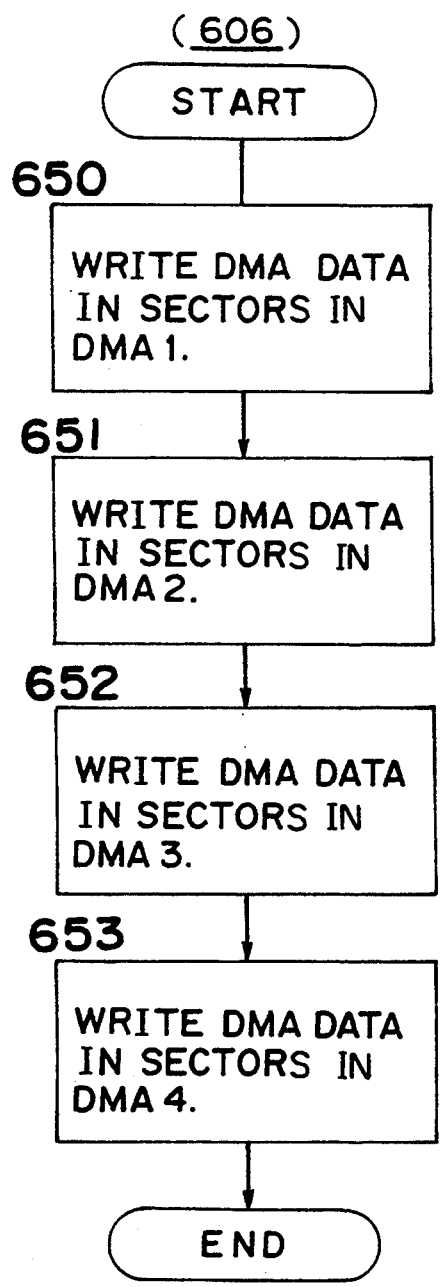

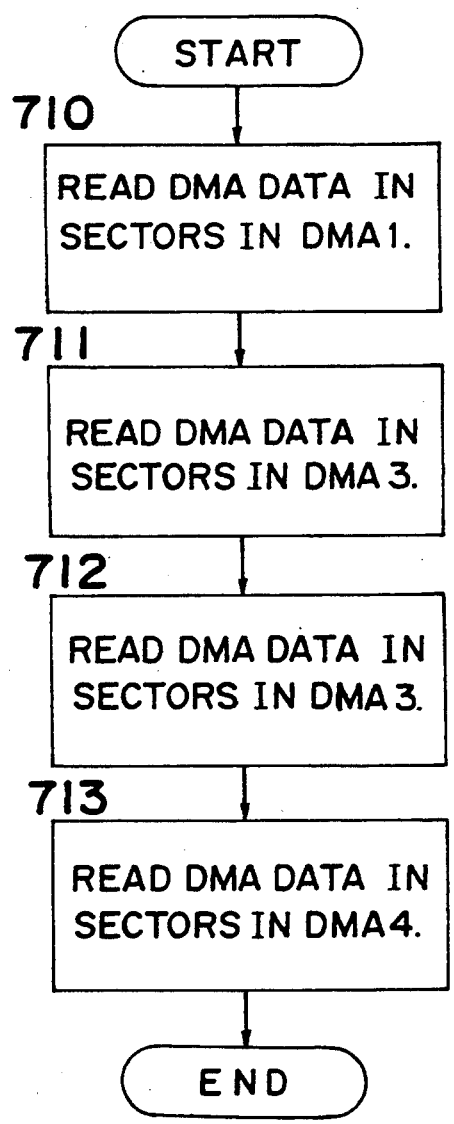

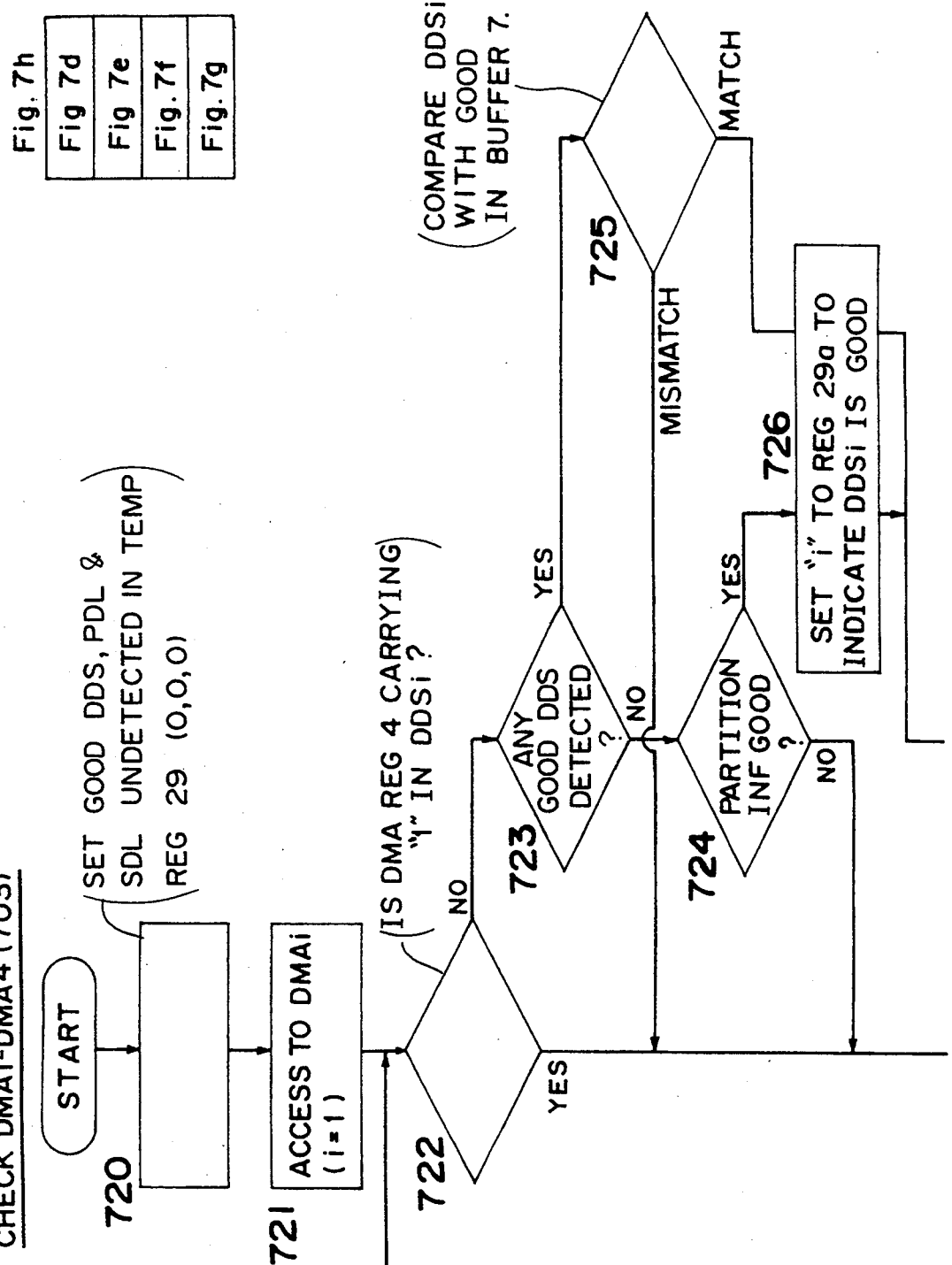
Fig. 7d CHECK DMA1-DMA4 (703)

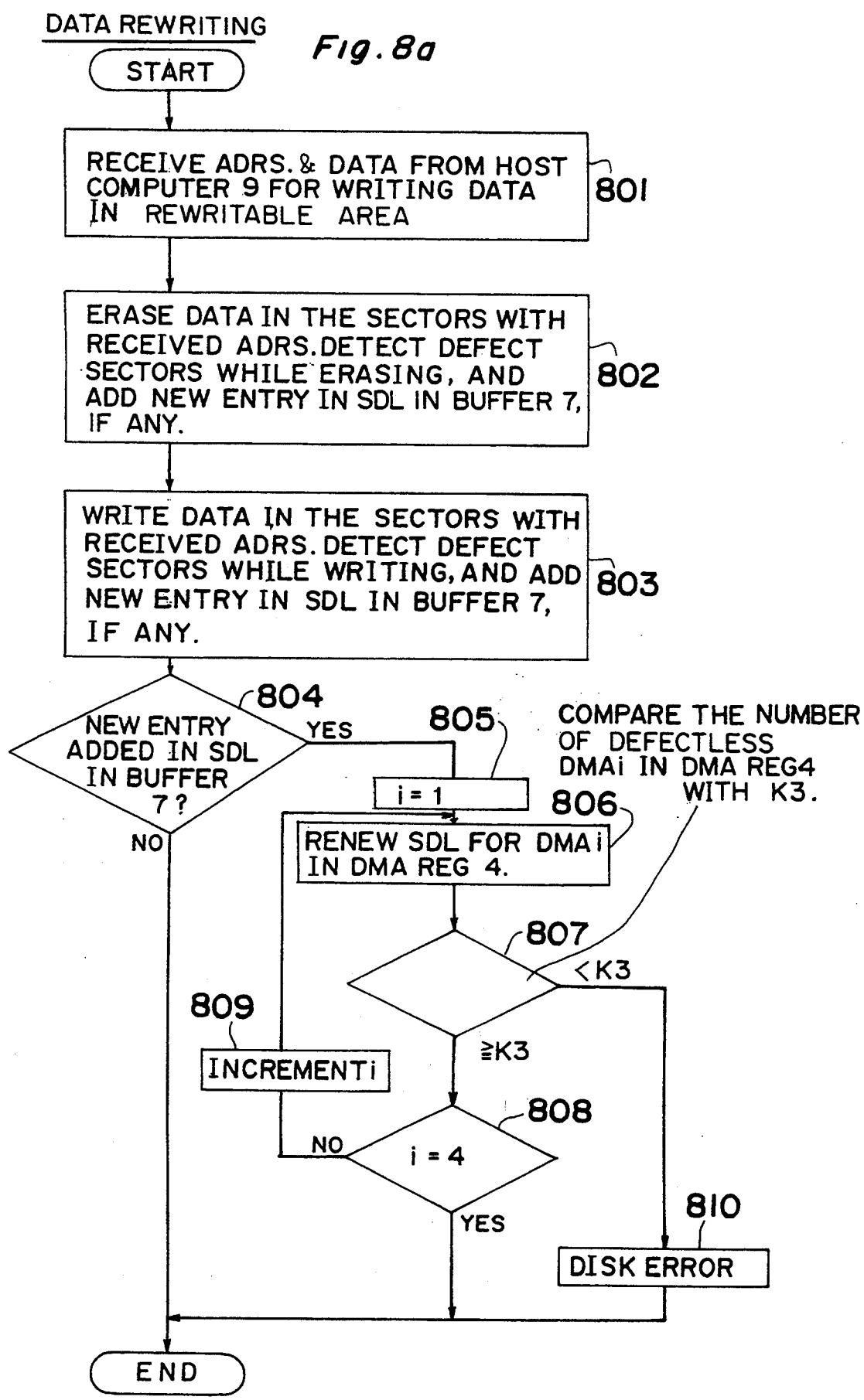

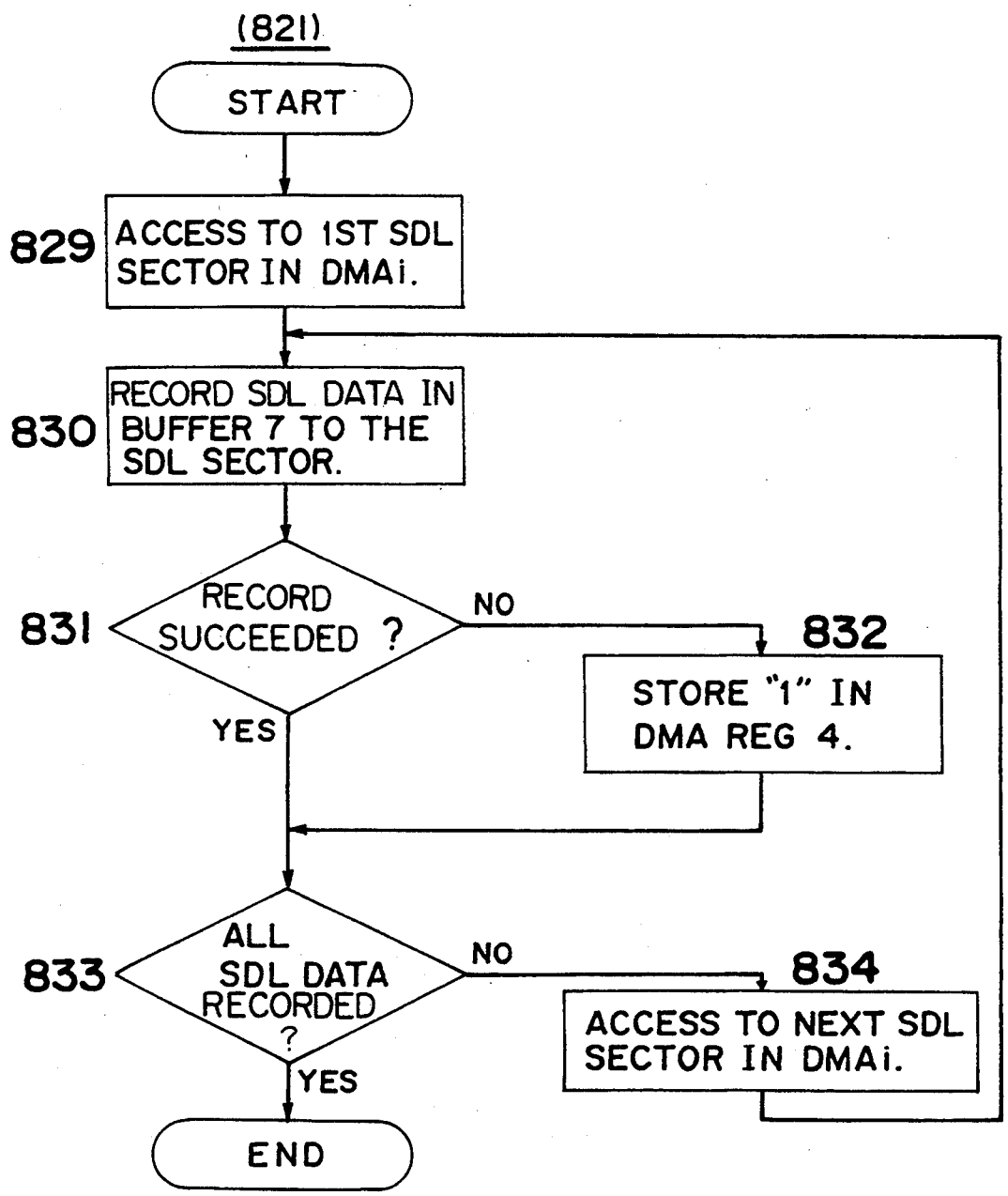

INFORMATION WRITING AND READING APPARATUS

BACKGROUND OF THE INVENTION

1. Field of the Invention

The present invention relates to an information writing and reading apparatus using an information recording medium having a plurality of sectors and, more particularly, to an information writing and reading apparatus which can prevent error operation caused by inconsistent management data stored in DMAs (Defect Management Areas).

2. Description of the Prior Art

Recently, an information writing/reading apparatus uses large capacity and interchangeable recording medium, such as an optical disk. Especially, an optical disk apparatus uses laser and forms tiny pits on the optical disk to write data on the disk. Therefore, the optical disk is very suitable for writing large capacity and interchangeable information. Since the optical disk is interchangeable, the optical disk is provided with a plurality of DMAs (Defect Management Areas), each storing the disk management information. The disk management information stored in the DMAs are exactly the same for the purpose of fail-safe. Each DMA has DDS (Disk Definition Structure) to specify the structure of the disk and a defect list information.

In FIG. 1, a user area of a 90 mm rewritable optical disk is shown. The disk is provided with four DMAs: DMA1 and DMA2 are positioned at the inner periphery of the disk; and DMA3 and DMA4 are positioned at the outer periphery of the disk. Four DMAs carry the same information from the viewpoint of fail-safe. If DMA1 is determined as unreliable, DMA2 is detected, and if DMA2 is unreliable, DMA3 is detected, and so on. The rewritable area is located between the inner periphery DMA2 and the outer periphery DMA3. Each DMA has one sector of DDS, a plurality of sectors of PDL (Primary Defect List) and a plurality of sectors of SDL (Secondary defect List).

In FIG. 2a, data construction of the DDS data is shown. The DDS has an identification code to indicate that this sector is the DDS, a partition information for the rewritable area, a PDL pointer indicating the address from which the PDL area starts, and an SDL pointer indicating the address form which the SDL area starts.

In FIG. 2b, data construction of the PDL data is shown. The PDL has an identification code to indicate that the following sectors are the PDL, a PDL list length of data indicating the list length of the following PDL list, and a PDL list listing the addresses of primary defect sectors. In the PDL list, one entry occupies four bytes for storing an address of a defect sector.

In FIG. 2c, data construction of the SDL data is shown. The SDL has an identification code to indicate that the following sectors are the SDL, an SDL list length of data indicating the list length of the following SDL list, and an SDL list listing the addresses of secondary defect sectors together with addresses of substitute sectors where the data is to be replaced. In the SDL list, one entry occupies eight bytes for storing an address of a defect sector and an address of a replaced sector.

The DDS and the PDL are recorded only at an initialization processing of the disk. The SDL is rewritten and recorded when the disk is initialized, and the defect sector is detected during the writing/reading processing of the data in the rewritable area without initialization. The DMA area of a 90 mm rewritable optical disk is specified in ISO/SC23 WG2 CD10090.

Generally, the format operation is done during the initialization of a disk. During the format operation, the DDS, the PDL which is stored with the defect sector detected at the certification (disk supervisory), and the SDL which has no entry of the defect sector are stored in the DMA area. Depending on the type of format, the certification processing is omitted, resulting in a blank PDL, storing no defect sector in the PDL area or eliminating the PDL itself.

The start up operation is done after the reset or insertion of a disk, and is to read the disk management information including the defect management information sent from the DMA area in the disk in order to initiate the writing and reading processing of the data for use in the disk.

The SDL updating process is to add new entries in the SDL to the disk, and is done after a new defect sector was detected during each reading or writing on a rewritable area on the disk.

However, the conventional information writing and reading apparatus has a problem such that the plurality of DMAs (DMA1, DMA2, DMA3 and DMA4), which should be completely identical to each other, may not be identical due to the presence of a defect sector in the DMA area or unexpected power failure during the formatting or updating of the defect list. Therefore, the conventional information writing and reading apparatus has a problem that when there is a discrepancy among the information stored in DMAs, the area management or the defect sector management can not be carried out properly.

SUMMARY OF THE INVENTION

The present invention has been developed with a view to substantially solving the above described disadvantages and has for its essential object to provide an information writing and reading apparatus which is capable of carrying out the format process causing no discrepancy among the writing contents of the DMA area, of carrying out the updating proces of the defect list so as to prevent failures in reading the DMA area due to a failure of an electric power supply and further of carrying out correctly the information writing and reading processes for the information recording medium having a discrepancy among the writing contents of the DMA due to the failure of the electric power supply.

In order to achieve the aforementioned objective, an information writing and reading apparatus according to the present invention comprises DMA sector condition storing means for storing condition data representing the condition of sectors in the DMAs; erasing means for erasing data in the recording disk by a sector; writing means for writing data in recording disk by a sector; reading means for reading data in recording disk by a sector; control means for controlling such that after one DMA sector is processed by any one of erasing means, writing means and reading means, a condition of one DMA sector is examined whether it is a defectless sector or a defect sector, and a flag representing the examined result is stored in DMA sector condition storing means.

Furthermore, according to the present invention, DMA data buffer means is provided for temporarily storing the DMA sector data.

An information writing and reading apparatus according to the present invention makes it possible to prevent different DMA data from being stored in different DMA areas. Also, it is possible to prevent incorrect data from being read from the DMA area having the information recorded incorrectly thereon. Therefore, the information writing and reading apparatus according to the present invention has a high reliability.

BRIEF DESCRIPTION OF THE DRAWINGS

These and other objects and features of the present invention will become clear from the following description taken in the preferred embodiment thereof with reference to the accompanying drawings throughout which like parts are designated by like reference numerals, and in which:

FIG. 6a is a flow chart showing an operation for formatting an optical disk;

FIG. 6b is a flow chart showing a detail of step 603 shown in FIG. 6a;

FIG. 6d is a flow chart showing a detail of step 605 shown in FIG. 6a;

FIG. 6e is a flow chart showing a detail of step 624 or 625 shown in FIG. 6d;

FIG. 6g is a flow chart showing a detail of step 606 shown in FIG. 6a;

FIG. 6i is a flow chart showing a detail of step 608 shown in FIG. 6a;

FIG. 7b is a flow chart showing a detail of step 702 shown in FIG. 7a;

FIGS. 7d, 7e, 7f and 7g, taken together as shown in FIG. 7h, illustrate a flow chart showing a detail of step 703 shown in FIG. 7a;

FIG. 8a is a flow chart showing an operation for renewing SDL data when data is written in rewritable area;

FIG. 8b is a flow chart showing a detail of step 806 shown in FIG. 8a;

FIG. 8d is a flow chart showing a detail of step 821 shown in FIG. 8b;

DETAILED DESCRIPTION OF THE PREFERRED EMBODIMENTS

Figure 3:
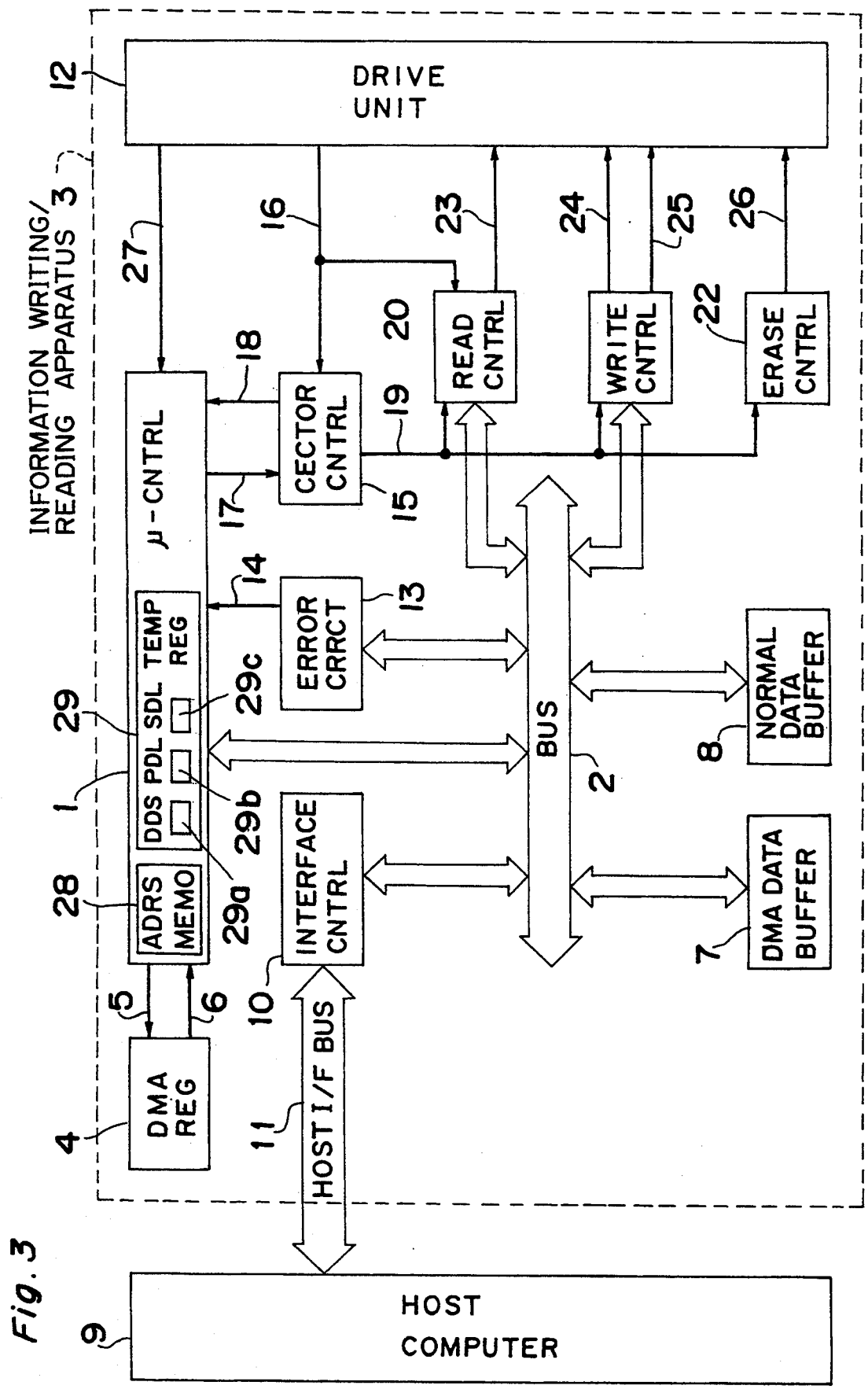
FIG. 3 is a block diagram of an information writing and reading apparatus according to a preferred embodiment of the present invention.

Referring to FIG. 3 a preferred embodiment of an information writing and reading apparatus according to the present invention is shown.

A reference number 1 is a micro controller, 2 is an internal bus, 4 is a DMA management register, 7 is a DMA data buffer, 8 is a normal data buffer, 9 is a host computer, 10 is an interface control circuit, 11 is a host interface bus, 12 is a drive unit, 13 is a error correction circuit, 15 is a sector control circuit, 20 is a read control circuit, 21 is a write control circuit and 22 is a erase control circuit. One of the outstanding features of the present invention is that DMA register 4 and DMA data buffer 7 are provided.

Figure 1:
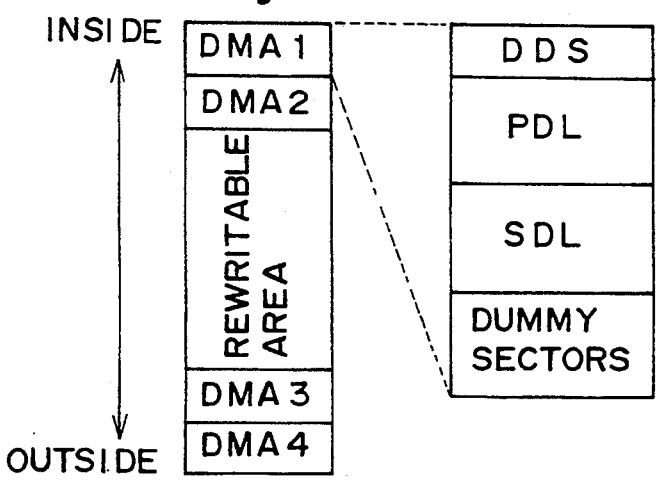
FIG. 1 is a diagram showing a layout of an optical disk.
Figure 2A:
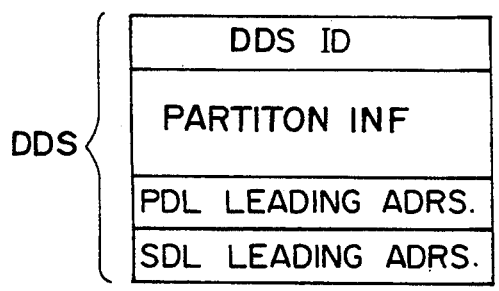
FIG. 2a is a diagram showing data contained in DDS.
Figure 2B:
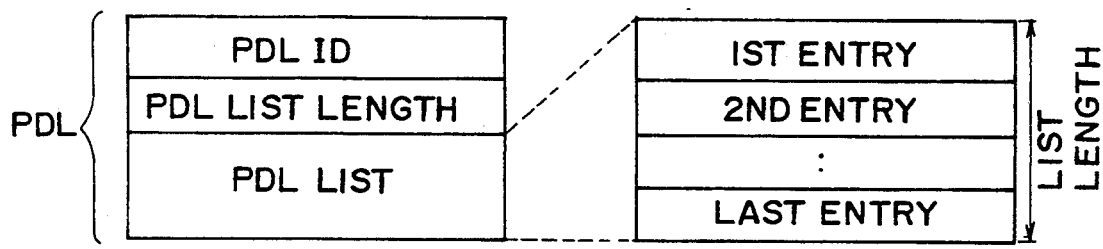
FIG. 2b is a diagram showing data contained in PDL.
Figure 2C:
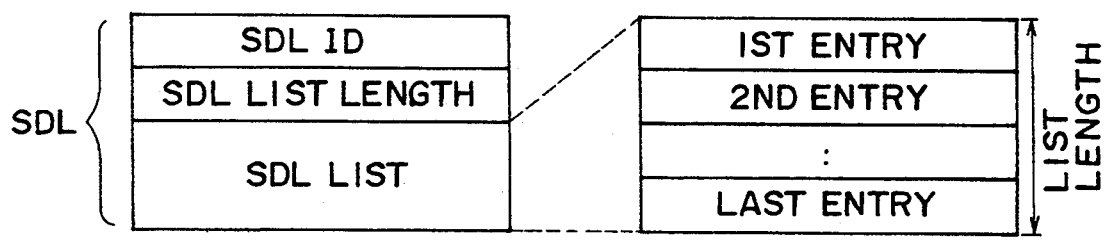
FIG. 2c is a diagram showing data contained in SDL.

Micro controller 1 has an address memory 28 for storing addresses from which defect management areas DMA1, DMA2, DMA3 and DMA4 start on an information recording medium, such as an optical disk (the locations of DMA1–DMA4 are described in FIG. 1), and a temporary register 29 having three register cells 29a, 29b and 29c for storing the checked condition of DDS, PDL and SDL (which are already described in FIGS. 2a–2c). The address memory 28 is used when formatting the optical disk, as will be described later in connection with FIG. 6c, and the temporary register 29 is used when checking the DMA1–DMA4 area in the disk, as will be described later in connection with FIGS. 7d–7g. Micro controller 1 further has a control program stored therein for controlling the operations of writing, erasing, reading, verifying and checking the data in the optical disk, as will be described later in connection with the flow charts.

Figure 4:
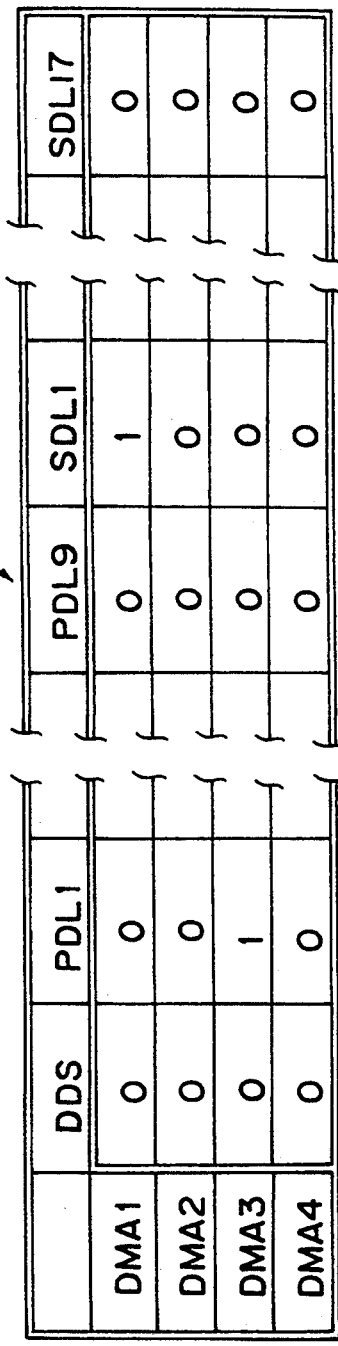
FIG. 4 is a table showing data carried in a DMA management register 4.

DMA management register 4, as best shown in FIG. 4, has cells to store flags "0" and "1". In the first row, the flags for the DMA1 information are stored. Similarly, in the second, third and fourth rows, the flags for the DMA2, DMA3 and DMA4 information are stored. In the first column indicated as DDS, flags representing the sector conditions of DDS sectors in the optical disk area are stored. In the columns PDL1–PLD9, flags representing the sector conditions of PDL sectors in the optical disk are stored. In the columns SDL1–SDL17, flags representing the sector conditions of SDL sectors in the optical disk are stored. When a particular sector is a good sector, a flag "0" is stored in a cell, and when a particular sector is a bad sector, a flag "1" is stored. Therefore, in the example shown in FIG. 4 in the optical disk the DMA1 area has a bad sector at SDL1, and the DMA3 area has a bad sector at PDL1. The writing of the flags are done by the signal transmitted along line 27 and 5 as shown in FIG. 3, and the reading of the flags are done by the signal along line 6.

Nine cells are provided for PDL in the case of a 90 mm rewritable optical disk, because a maximum of 1024 defect sectors are permitted. When one defect sector is found in the rewritable area, it takes four bytes to make one entry in the PDL list. Therefore, for the 1024 defect sectors, 1024 entries are made, resulting in 4096 bytes.

Since one sector is 512 byte long, 4096 bytes is equal to eight sectors. Since there are other codes inserted, nine sectors are necessary for the PDL area in the optical disk. Therefore, nine cells are provided to indicate a bad or good condition of the nine sectors. The reason for the presence of 17 SDL registers can be explained in a similar way to that mentioned above. One SDL entry takes eight bytes.

Figure 5:
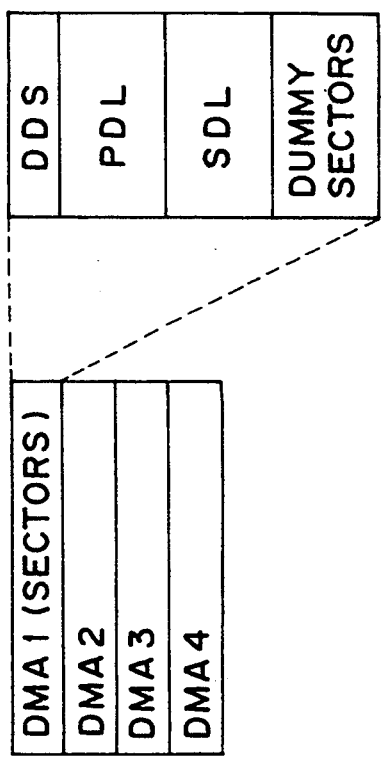
FIG. 5 is a diagram showing the structure of DMA data buffer 7.

DMA data buffer circuit 7, as best shown in FIG. 5, is a memory buffer for temporarily storing the same or revised data as that stored in DMA1, DMA2, DMA3 and DMA4 areas in the optical disk. Therefore, DMA data buffer circuit 7 has four areas to store DMA1-DMA4 data, respectively, and each area has a size equal to 19 sectors for storing DDS, PDL, SDL and dummy sectors. The data capacity read out from each of the DMA area reaches maximum value when, for example, the PDL stores one defect sector and SDL stores 1023 defect sectors. The data capacity added with DDS results in 19 sectors. Accordingly, the DMA data buffer 7 is provided with areas necessary for storing data corresponding to 19 sectors read from each of DMA areas.

Data buffer circuit 8 is a memory circuit for temporarily storing the normal data, i.e., the data stored in the rewritable area, so that during the writing mode, the normal data from the host computer 9 is temporarily stored in the normal data buffer 8 through bus 11, interface circuit 10 and bus 2, and then, is further written on the optical disk through bus 2, write control circuit 21 to drive unit 12. During the reading mode, the normal data on the optical disk is read and transmitted to normal data buffer 8 through read control 20 and bus 2, and then further to host computer 9 through bus 2, interface control 10 and bus 11.

Interface control circuit 10 is connected to the host computer 9 through a host interface bus 11 such as SCSI and is to control the transferring operation of command data, user data and status data from the host computer 9.

Drive unit 12 is connected to a drive interface such as ESDI and carries out the writing and reading operations of data sector-by-sector on an information recording medium, such as an optical disk (not shown) loaded therein.

Error correction circuit 13, during the writing operation, provides an error correction code to the sector data stored in the DMA data buffer circuit 7 or in the data buffer circuit 8, and during the reading operation, carries out an error correction. When the error correction is unsuccessful, error correction circuit 13 outputs a correction failure signal 14.

Sector control circuit 15 reads (or demodulates) address data from reading data obtained from line 16. When the read address data from line 16 coincides with the address data from micro controller 1 an enable signal is produced along line 19 to enable read circuit 20, write circuit 21 or erase circuit 22. When sector control circuit 15 fails to read the address specified by a target address signal along line 17, the sector control circuit 15 outputs an ID error signal along line 18.

Read control circuit 20 outputs a read gate along a line 23 and receives read data along line 16. Write control circuit 21 outputs write data along line 24 and a write gate along a line 25. Erase control circuit 22 outputs an erase gate along a line 26.

Next, operations for erasing, writing and reading the data on the optical disk are explained.

First, the description is directed to an erase operation at a rewritable area. The host computer 9 issues an erase command to interface control circuit 10 through the host interface bus 11. The interface control circuit 10 sends the received command to data buffer circuit 8 through an internal bus 2. Then, micro controller 1 reads the command stored in the data buffer 8 through the internal bus 2 and acknowledges the receipt of erase command. Micro controller 1 sets an address of the sector to be erased, and sends it to the sector control circuit 15 through line 17 as the target address signal. As the sector control circuit 15 reads sector addresses from the optical disk along line 16, it compares the read address with the target address from micro controller 1. When the read address coincides with the target address, an enable signal is provided along line 19 to activate the erase control circuit 22. The erase control circuit 22 sends the erase gate along line 26 to the drive unit 12. Then, drive unit 12 erases the sector with the target address in accordance with the erase gate.

Next, the description is directed to the erase operation of the entire DMA area. For example, when disk formatting is requested, micro controller 1 carries out a program to erase the DMA area. The micro controller 1 initializes DMA management register 4 by a write signal along line 5. Then, micro controller 1 reads address memory 28 carrying sector addresses of DMA-1–DMA4, and provides the sector address data to sector control circuit 15 through line 27. As the sector control circuit 15 reads addresses on the optical disk through line 16, it compares the read address with the address obtained from micro controller 1. When the read address coincides with the target address from micro controller 1, an enable signal is produced along line 19. Then, erase control circuit 23 sends the erase gate though line 26 to the drive unit 12. The drive unit 12 erases the sector in accordance with the erase gate. The detail of the erase operation will be given later in connection with FIGS. 6b and 6c.

Next, the description is directed to the writing operation at the rewritable area. When the host computer 9 issues a writing command, the writing data is transmitted to the interface control circuit 10 through the host interface bus 11. The interface control circuit 10 sends the write command as well as the write data from the host computer 9 to the data buffer circuit 8 through the internal bus 2. The micro controller 1 reads the data in the data buffer 8 through the internal bus 2 and acknowledges the write command. The micro controller 1 activates the error correction circuit 13 and gives an error correction code to the data in a sector unit stored in the data buffer circuit 8. The micro controller 1 sets and provides a sector address as a target address to the sector control circuit 15 through line 17. As the sector control circuit 15 reads addresses from the optical disk, it compares the read addresses with the target address. When the read address coincides with the target address, the write control circuit 21 is activated by an enable signal produced along line 19. The write control circuit 21 sends the write gate along line 25 to drive unit 12 and simultaneously sends the write data along line 24 obtained from the data buffer 8 through internal bus 2. The drive unit 12 records the sector in accordance with the write data along line 24 and the write gate along line 25.

Next, the description is directed to the writing operation in the DMA area. For example, when a disk formatting is requested, micro controller 1 activates error correction circuit 13 to give an error correction code to the DMA area stored in the DMA data buffer circuit 7. The micro controller 1 sets and provides a sector address as a target address to the sector control circuit 15 through line 17. As the sector control circuit 15 reads addresses from the optical disk, it compares the read addresses with the target address. When the read address coincides with the target address, the write control circuit 21 is activated by the enable signal 19. The write control circuit 21 sends a write gate along line 25 to the drive unit 12. The drive unit 12 receives the write data along line 24 from the data read from the DMA data buffer 7 through the internal bus 2. The drive unit 12 records the sector in accordance with the write data along line 24 and the write gate along line 25.

Next, the description is directed to the reading operation in the rewritable area. When a data read is requested, the host computer 9 issues a read command to the interface control circuit 10 through the host interface bus 11. The interface control circuit 10 sends the read command to the data buffer circuit 8 through the internal bus 2. The micro controller 1 reads the data from buffer circuit 8 through the internal bus 2 and acknowledges the read command. The micro controller 1 sets and provides a sector address as a target address to the sector control circuit 15 through line 17. As the sector control circuit 15 reads addresses from the optical disk, it compares the read addresses with the target address. When the read address coincides with the target address, the read control circuit 20 is activated by the enable signal 19. The read control circuit 20 sends the read gate along line 23 to the drive unit 12 and simultaneously receives the read data along line 16 from the drive unit 12. The read data is further sent to the data buffer circuit 8 through the internal bus 2. The error correction circuit 13 carries out the error correction with respect to the read data stored in the data buffer circuit 8. The micro controller 1 commands the control circuit 10 to transfer the data. The interface control circuit 10 receives the read data from the data buffer circuit 8 through the internal bus 2 and sends the read data to the host computer 9 through the host interface bus 11.

Next, the description is directed to the reading operation in the DMA area. For example, when a disk formatting is requested, the micro controller 1 sets and provides a sector address as a target address to the sector control circuit 15 through line 17. As the sector control circuit 15 reads addresses from the optical disk, it compares the read addresses with the target address. When the read address coincides with the target address, the read control circuit 20 is activated by the enable signal 19. The read control circuit 20 sends a read gate along line 23 to the drive unit 12 and simultaneously receives the read data along line 16 from the drive unit 12. The read data is further sent to the DMA data buffer circuit 7 through the internal bus 2. The error correction circuit 13 carries out the error correction with respect to the read data stored in the DMA data buffer circuit 7. When micro controller 1 detects the ID error signal along line 18 from the sector control circuit 15 or the correction failure signal 14 from the error correction circuit 13, micro controller 1 sends along line 5 a defect signal to DMA management register 4 to renew the flag at the corresponding area. Then, micro controller 1 reads the DMA management register 4 through line 6 and checks whether the DMA area is correctly read at the final step.

A verify operation can be carried out in a similar way to that of the reading operation.

Referring to FIG. 6 a flow chart for formatting an optical disk is shown.

(601) When the information writing and reading apparatus according to the present invention uses, for example, SCSI as a host interface, host computer 9 produces a MODE SELECT command to set a control parameter for the format process. The format parameter transferred from the host computer 9 during the execution of the command is stored in the micro controller 1 through the interface control circuit 10. The format parameter includes data indicating whether or not certification is necessary, and data indicating the maximum permitted number of DMAs for the defect sectors. When the host computer 9 does not produce the MODE SELECT command, the micro controller 1 sets a default value of a format parameter in accordance with the control procedure stored therein.

(602) Host computer 9 issues the FORMAT UNIT command. Then, the micro controller 1 sets "1", indicating a bad sector, to all cells in the DMA management register 4.

(603) Micro controller 1 erases all data of the DMA areas in an order of DMA 1, DMA 2, DMA 3, and DMA 4.

(604) It is detected whether or not any bad sector is detected during the erasing of the data at the DMA areas. If any bad sector is detected, the program goes to step (611) to indicate the format error and to terminate the formatting. On the other hand, if no bad sector is detected, the program goes to step (605).

(605) When the execution of certification is necessitated by the format parameter, the program executes the certification procedure which includes write processing for writing test data on all of the rewritable areas and verify processing. The defect sectors detected during these processing steps are temporarily stored in DMA data buffer 7 as the PDL of DMA data.

(606) The micro controller 1 generates DDS and SDL corresponding to the content of the certification and stores the DDS and the SDL in the DMA data buffer 7. Next, the micro controller 1 records the data stored in the DMA data buffer 7 to the DMA areas in the optical disk in the order of DMA 1, DMA 2, DMA 3 and DMA 4.

(607) It is detected whether or not any bad sector is detected during the writing of the data at the DMA areas. If any bad sector is detected, the program goes to step (611) to indicate the format fault and to terminate the formatting. On the other hand, if no bad sector is detected, the program goes to step (608).

(608) The micro controller 1 verifies the DMA area in the optical disk in the order of DMA 1, DMA 2, DMA 3 and DMA 4. During the verification, the program sets "0" to the DMA register 4 corresponding to the defectless sectors, i.e., the sectors in the DMA area where the ID error nor the error correction error are not detected.

(609) The program checks the content of each of the management register groups at the DMA area (DMA 1, DMA 2, DMA 3 and DMA 4 registers). When bad sectors in he DMA area are detected more that a predetermined number K1, the program goes to step (611) to indicate the format fault and to terminate the formatting. On the other hand, when the number of the bad sectors is less that the predetermined number K1, the program goes to step (610). The number K1 is set at step (601), and can be made variable according to the operator's setting.

(610) The micro controller 1 reports the host computer 9 that the disk formatting is completed.

(611) The micro controller 1 reports the host computer 9 that the disk formatting is failed.

The detail of steps (603), (605), (606) and (608) will be described below.

Referring to FIG. 6b, a detail of step (603) for erasing DMA in the optical disk is shown.

(612) The data in the sectors on the optical disk carrying DMA1 is erased.

(613) The data in the sectors on the optical disk carrying DMA2 is erased.

(614) The data in the sectors on the optical disk carrying DMA3 is erased.

(615) The data in the sectors on the optical disk carrying DMA4 is erased.

Figure 6C:
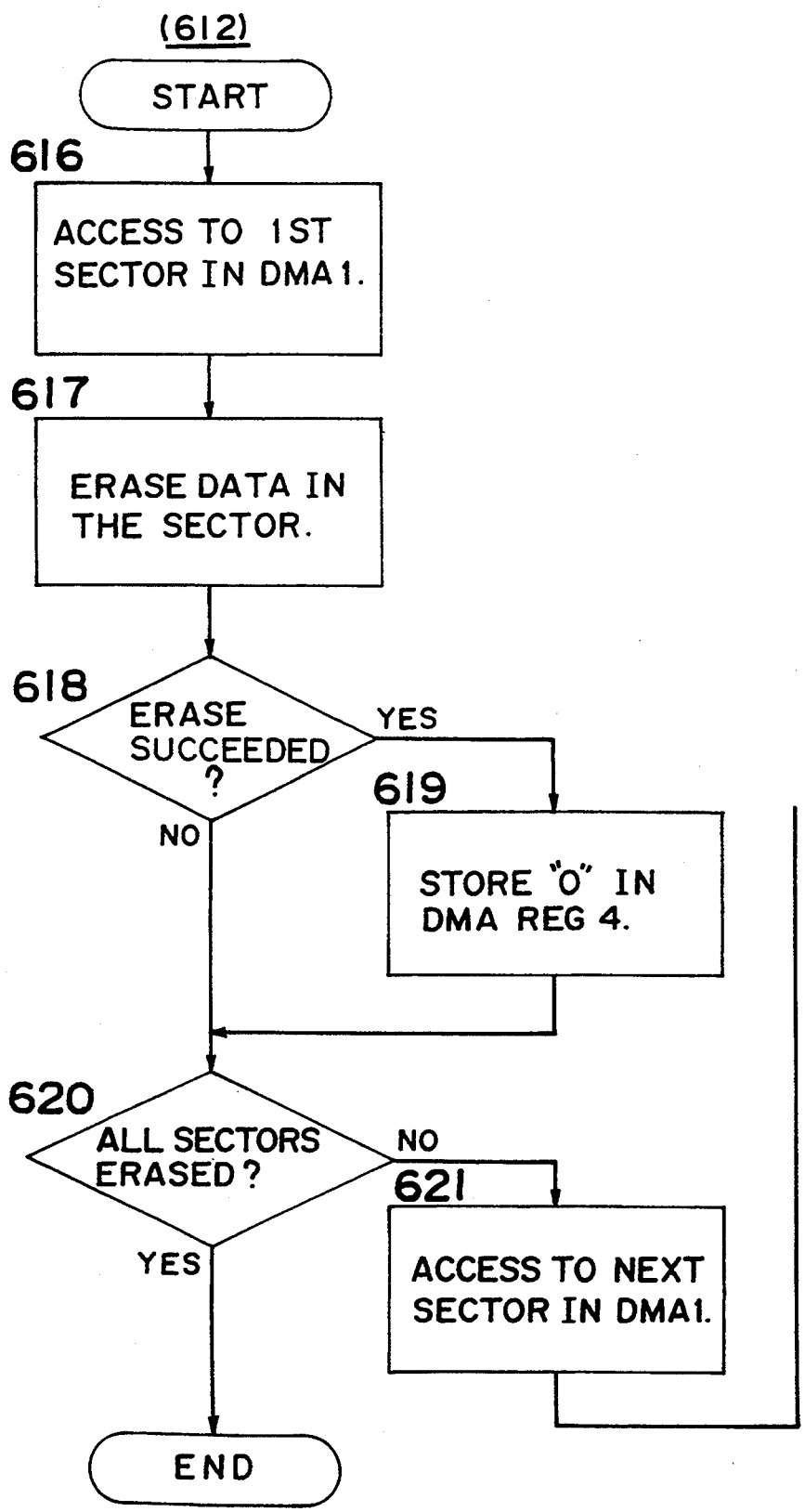
FIG. 6c is a flow chart showing a detail of step 612 shown in FIG. 6b.

Referring to FIG. 6c, a detail of step (612) for erasing the data carried in the sectors of DMA1 is shown.

(616) By making reference to address memory 28, the sectors which carries DMA1 data are detected, and the first one of the detected sectors is addressed.

(617) The data in the accessed sector are erased.

(618) It is detected whether or not the erasing is successfully completed. When the detected result is NO, the program advances to step (620).

(619) When the erasing is successfully completed, micro controller 1 makes DMA register 4 to store "0" in the cell corresponding to the accessed sector to indicate that the accessed sector is a good sector. When the detected result at step (618) is NO, the program goes to step (620) without changing the data in the DMA register 4. Thus, the cell corresponding to the accessed sector continues to hold "1" to indicate that the accessed sector is a bad sector. This is possible because all the cells are initially set to "1" at step (602).

(620) It is detected whether or not the data in all the sectors for the DMA1 area are erased.

(621) The next sector for the DMA1 area is accessed.

Referring to FIG. 6d, a detail of step (605) for certification is shown.

(622) It is detected whether or not certification is required. Depending on the format parameter, the certification is omitted.

(623) DMA data buffer 7 is so framed as to make no entry of the PDL. Thus, in this case, the PDL made in buffer 7 would be such that PDL list length is zero, and no entry is given in the PDL list.

(624) The data in all the sectors in the rewritable area are erased. A further detail of this step is shown in FIG. 6e.

(625) All the sectors in the rewritable area are written with test data. A further detail of this step is shown in FIG. 6e.

Figure 6F:
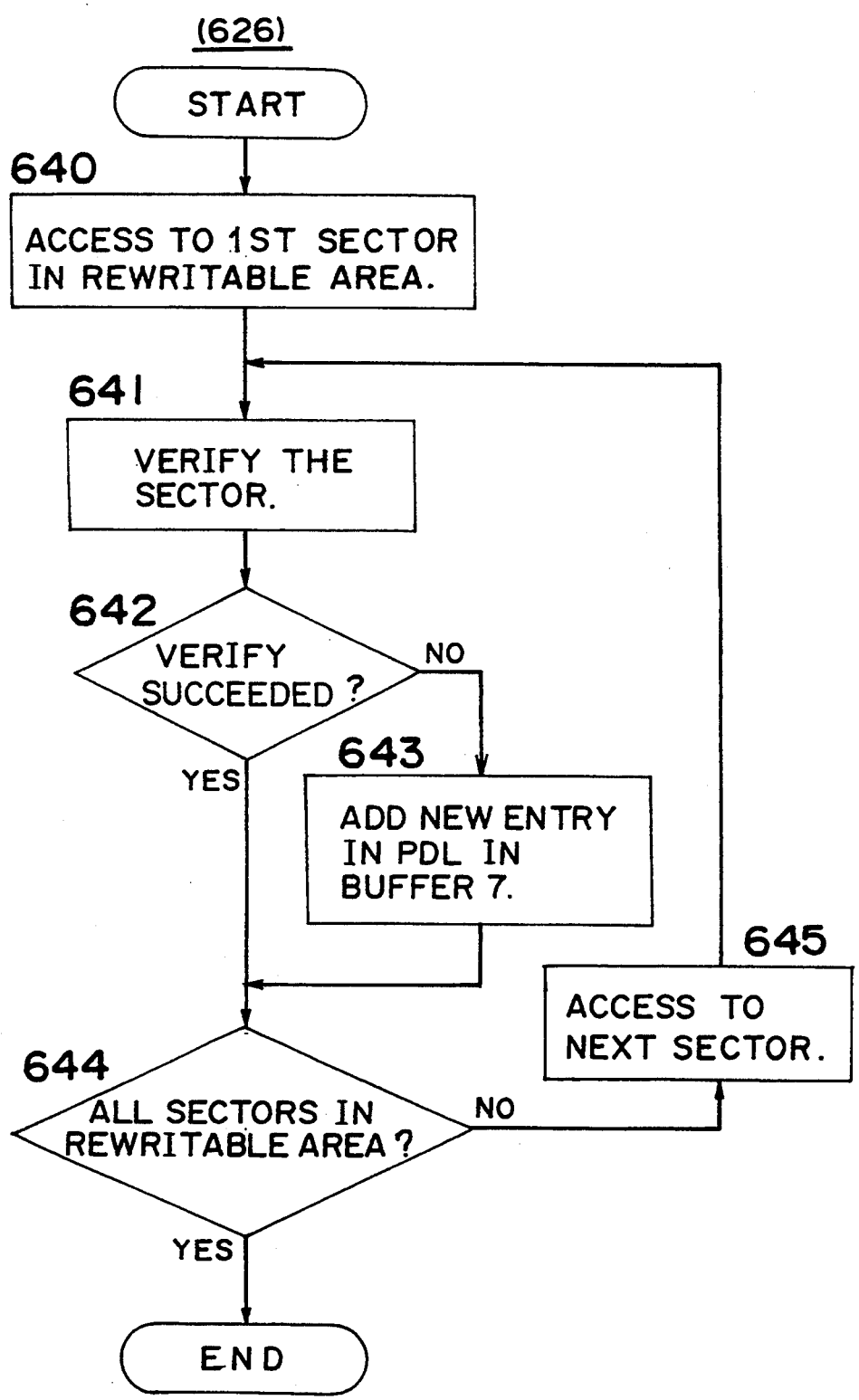
FIG. 6f is a flow chart showing a detail of step 626 shown in FIG. 6d.

(626) All the sectors in the rewritable area are verified. During the verification, if any bad sector is detected in the rewritable area, the address of such a bad sector is written in PDL in buffer 7. A further detail of this step is shown in FIG. 6f.

(627) An address of a sector next to the DDS sector in the DMA area is allocated as the first sector for the PDL.

(628) As the number of new entries for the PDL is know from step (626), an address of a sector next to the last PDL sector is allocated as the first sector for the SDL.

(629) The first sector for the PDL is stored with data "FFFFh" (h indicates a hexadecimal numbering system) indicating that the PDL is not present.

(630) An address of a sector next to the DDS in the DMA area is allocated as the first sector for the SDL.

(631) The DDS is formed in DMA data buffer 7.

(632) DMA data buffer 7 is so framed as to make no entry of the SDL. Thus, in this case, the SDL made in DMA data buffer 7 would be such that SDL list length is zero, and no entry is given in the SDL list.

Referring to FIG. 6e, a detail of step (624) or (625) is shown.

(633) An access is made to the first sector in the rewritable area.

(634) The data in the accessed sector is erased for the case of step (624). For the case of step (625), test data is written in the accessed sector.

(635) It is detected whether or not all the sectors in the rewritable area are accessed.

(636) An access is made to the next sector in the rewritable area.

Referring to FIG. 6f, a detail of verification step (626) is shown.

(640) An access is made to the first sector in the rewritable ares.

(641) The accessed sector is verified.

(642) It is detected whether or not the verification is successfully completed.

(643) If the verify is not successful, the accessed sector is determined as a bad sector. Thus, the address data of the accessed sector is added in the PDL area in DMA data buffer 7 as a new entry.

(644) It is detected whether or not all the sectors in the rewritable area are accessed.

(645) An access is made to the next sector in the rewritable area.

Referring to FIG. 6g, a detail of writing step (606) is shown.

(650) The sectors in the optical disk for the DMA1 are written.

(651) The sectors in the optical disk for the DMA2 are written.

(652) The sectors in the optical disk for the DMA3 are written.

(653) The sectors in the optical disk for the DMA4 are written.

Figure 6H:
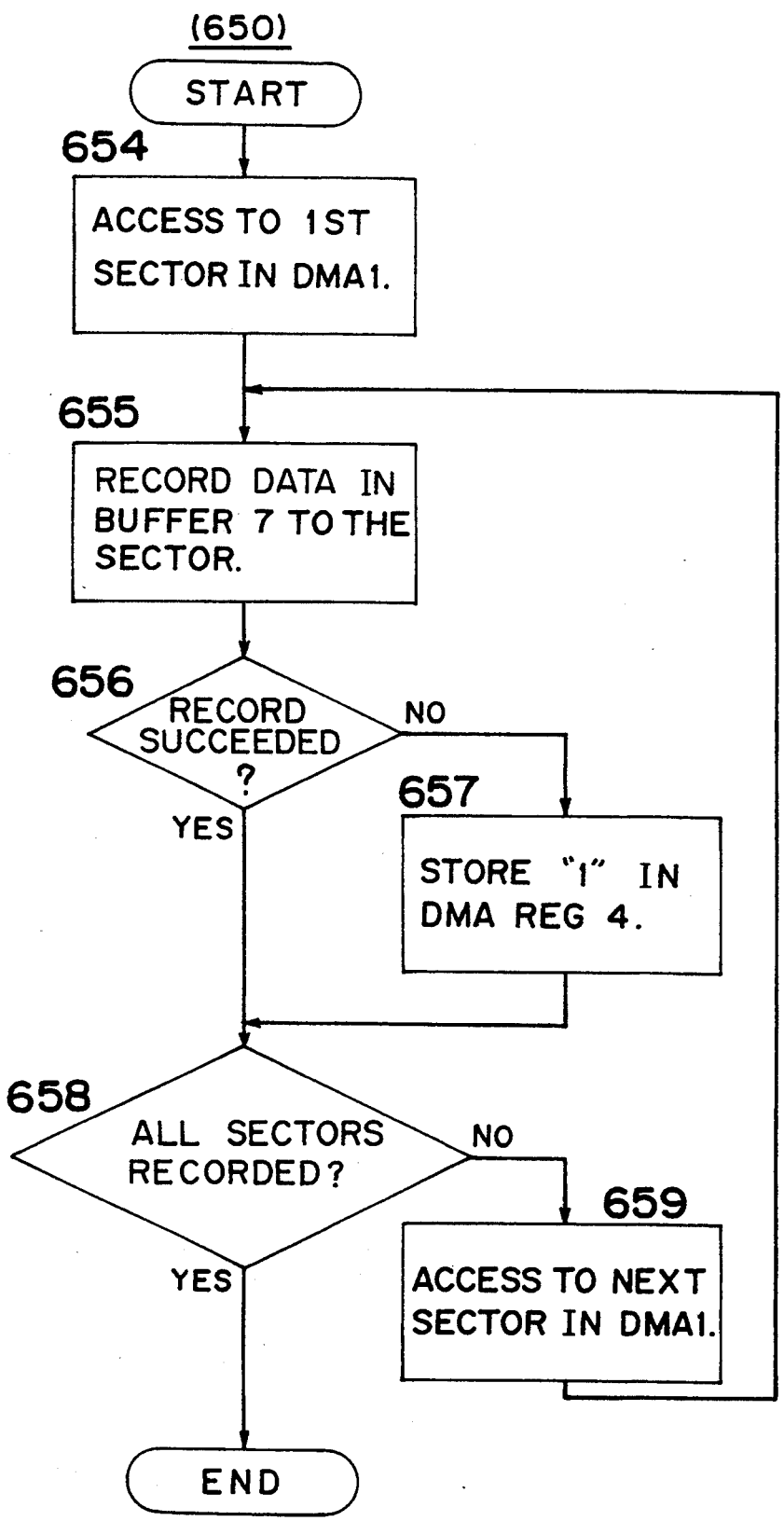
FIG. 6h is a flow chart showing a detail of step 650 shown in FIG. 6g.

Referring to FIG. 6h, a detail of writing step (650) is shown.

(654) An access is made to the first sector in the DMA1 area.

(655) The data for the DMA1 as stored in DMA data buffer 7 is recorded to the DMA1 area on the optical disk.

(656) It is detected whether or not the data record is successfully completed.

(657) If the data record is not successful, the accessed sector is determined as a bad sector. Thus, the micro controller 1 sets "1" indicating a bad sector to a cell corresponding to the accessed sector in the DMA management register 4.

(658) It is detected whether or not all the data from the DMA data buffer 7 are recorded to the corresponding DMA1 area in the optical disk.

(659) An access is made to the next sector in the DMA1 area.

Figure 6I:
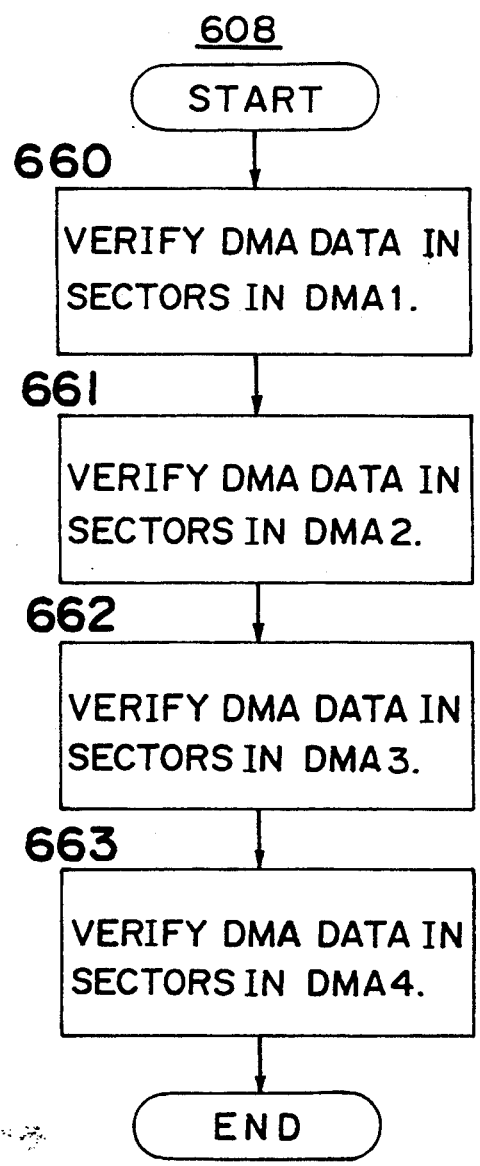

Referring to FIG. 6i, a detail of the verification step (608) is shown.

(660) The data stored in the sectors for DMA1 are verified.
(661) The data stored in the sectors for DMA2 are verified.
(662) The data stored in the sectors for DMA3 are verified.
(663) The data stored in the sectors for DMA4 are verified.

Figure 6J:
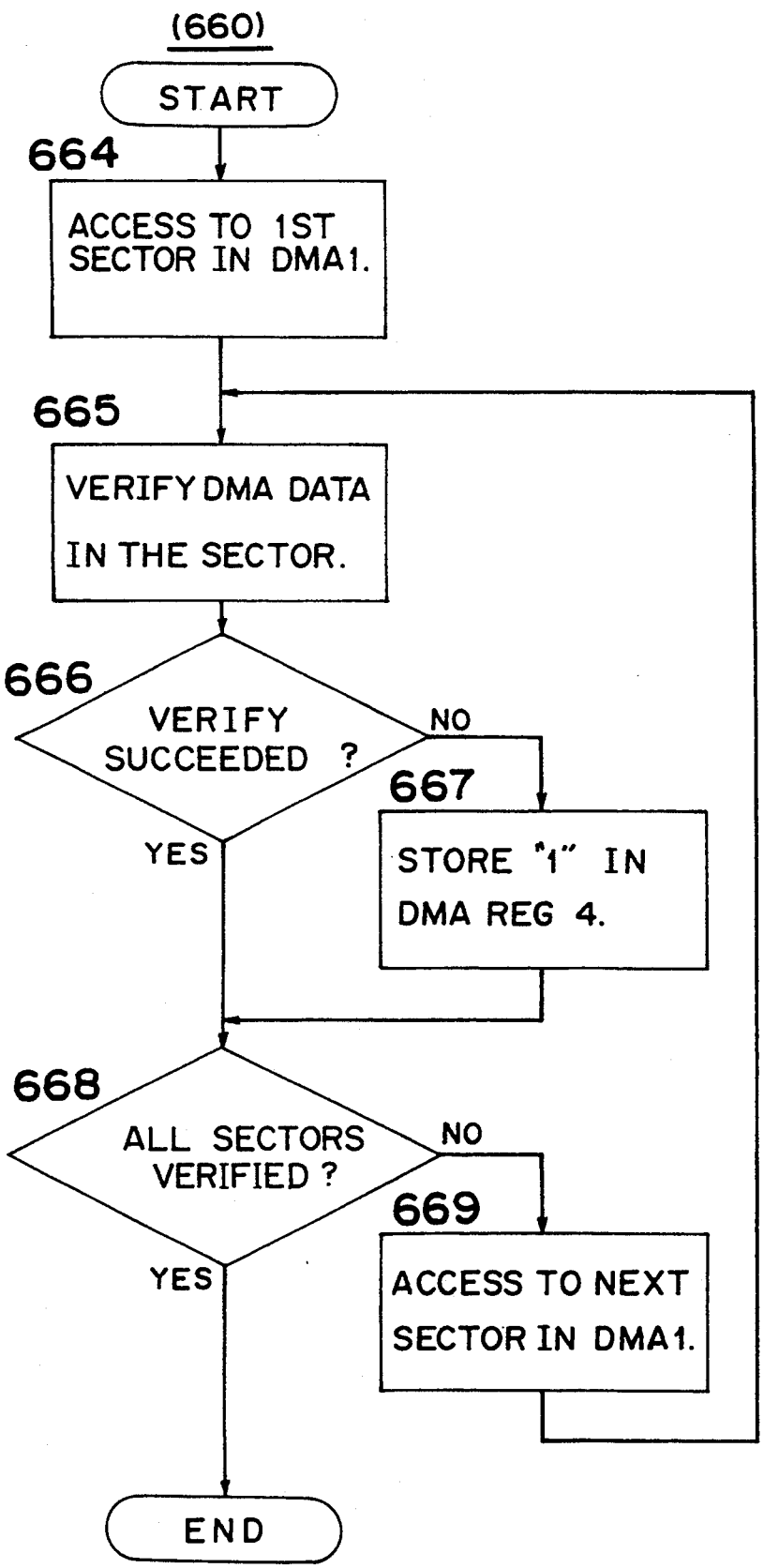
FIG. 6j is a flow chart showing a detail of step 660 shown in FIG. 6i.

Referring to FIG. 6j, a detail of step (660) is shown.
(664) An access is made to the first sector in the DMA1.
(665) The data stored in the accessed sector are verified.
(666) It is detected whether or not the verification is successfully completed.
(667) If the verification is not successful, the accessed sector is determined as a bad sector. Thus, the micro controller 1 sets "1", indicating a bad sector, to a cell corresponding to the accessed sector in the DMA management register 4.
(668) It is detected whether or not all the data in the accessed sector are verified.
(669) An access is made to the next sector in the DMA1.

The format processing is executed in the procedure mentioned above. Even when the processing is stopped intermediately due to the failure of an electric power supply before the completion of the step (605), the program assumes the disk as is in an unformat state because all of the DMA areas have been erased already. Accordingly, there is no chance to reproduce incorrectly the test data used in the certification.

In the case where the information recording medium is an over-writing type, such as a phase change optical disk, it is assumed that each of sectors at the DMA areas records dummy data, such as "FFh" (h indicates a hexadecimal numbering system), which is written in each sector in the DMA area to nullify the data already stored therein. By so doing, it is possible to achieve the same effect as that mentioned above.

Figure 10:
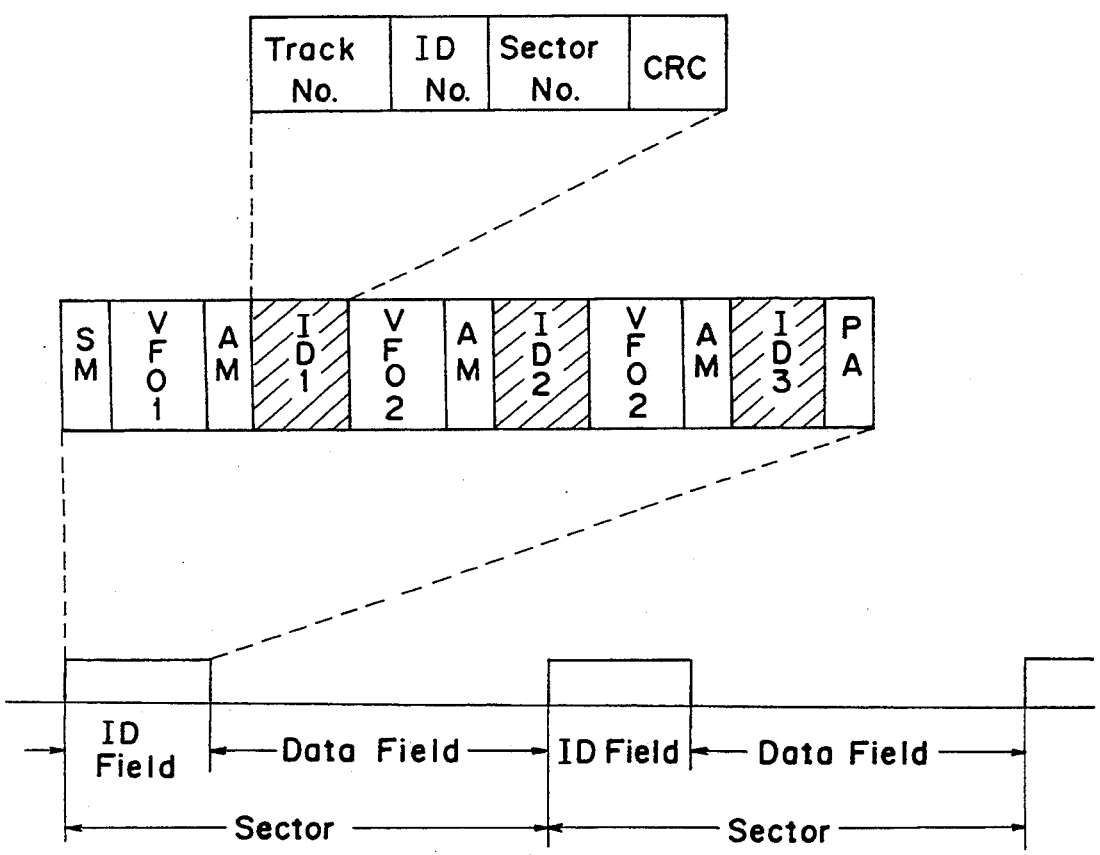
FIG. 10 is a diagram showing a format for storing data in each sector on the optical disk.

Furthermore, in the case where the optical disk stores a plurality of ID codes at the address section of each sector, as shown in FIG. 10, the number of the ID codes to be detected from the target sector during the data erasing processing or the data writing processing is set to a number which is greater than the number of the ID codes to be detected during the data reading processing. Such an arrangement makes it possible to execute control processing so as to ensure the reliability of the user data. However, in the data erasing processing at the DMAs during step (605), the number of ID codes to be detected is set to the same number as that required in the reading processing. This can prevent the incorrect reading of the old data stored in the sectors in the DMA area which failed to be erased completely due to the error in ID code. Further, this can prevent any inconsistency among the data read from DMA1, DMA2, DMA3 and DMA4.

In addition, at step (601), since it is possible to change the allowable number K1 representing the number of defect sectors in the DMA area, the disk with different qualities can be presented. As a result, it is possible to respond easily to the requirement of various users in a cost effective manner.

Figure 7A:
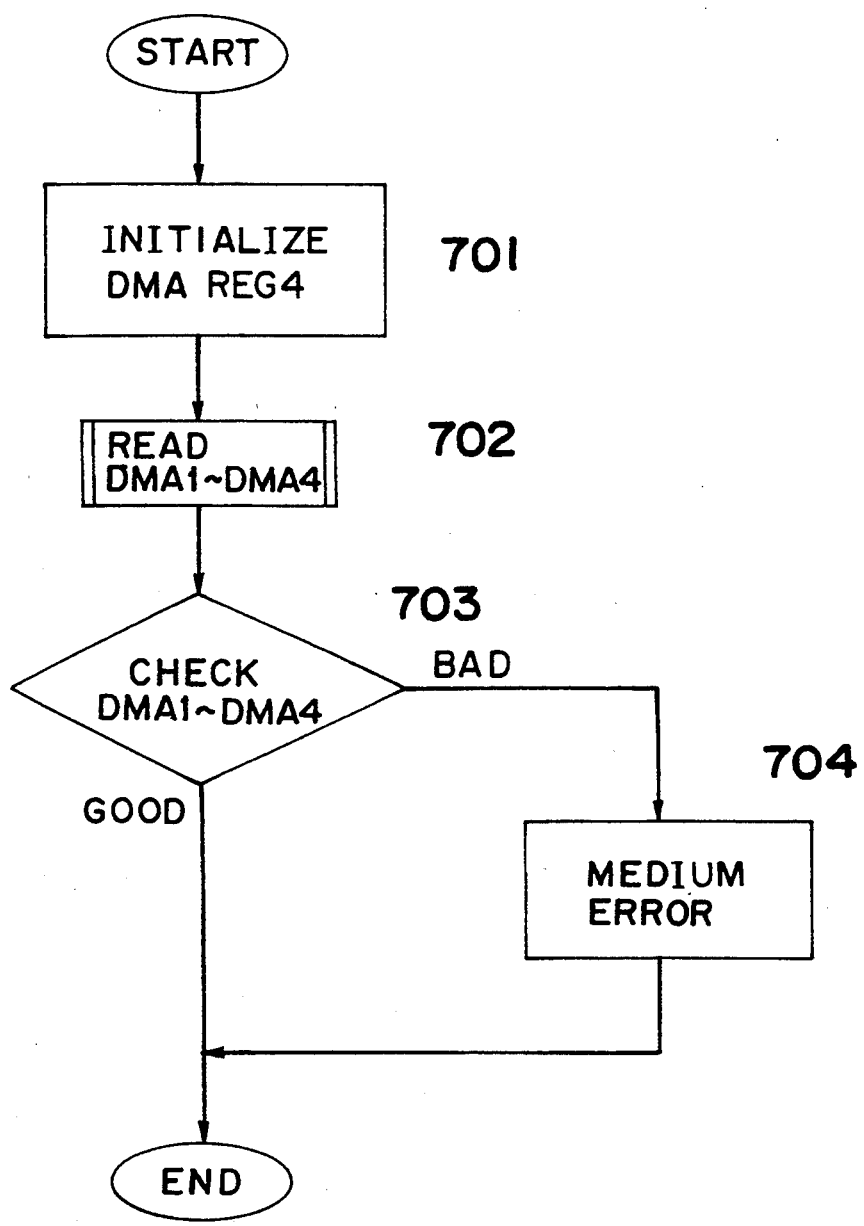
FIG. 7a is a flow chart showing an operation of reading DMA data when the apparatus is reset or when the optical disk is loaded.

Referring to FIG. 7a a flow chart for reading the DMA area is shown. The reading of the DMA area from the optical disk takes place when the optical disk is loaded in the apparatus or when the apparatus is reset.

(701) The micro controller 1 sets "1", indicating a bad sector, to all cells in the DMA management register 4.
(702) The program reads all the data from the DMA area on the optical disk and stores the read data correspondingly in the DMA data buffer 7. During this data reading, the program sets "0" to the DMA register 4 corresponding to the defectless sectors, i.e., the sectors in the DMA area where the ID error nor the error correction error are not detected.
(703) The program reads the DMA area and checks DMAi (i=1, 2, 3, 4) if the DDS sector of the read DMAi is correctly detected. If the DDS sector of the read DMAi is not correctly detected, the program sets "1" in the DMA register 4 in all the cells corresponding to the DMAi including the cells for the PDL and the SDL. The correct DDS sector which is detected as correct for the second time is compared with the correct DDS sector detected as correct for the first time to confirm that the partition information is the same between these two DDS sectors. If there is some inconsistency in the partition information between these two DDS sectors, the program sets "1" in the DMA register 4 in all the cells, including the cells for the PDL and the SDL, in the DMAi with the DDS sector detected as correct for the second time. Then, the program checks the DMAi with the correct DDS whether the ID code and the list length are correct with reference to the PDL sectors and SDL sectors. If the identifier has a value different from the definition, or if the number of entries do not correspond to the stored list length, or if the present PDL or the present SDL is different from the previous PDL or the previous SDL in a similar manner to that of DDS, the program judges that all of PDL or SDL are incorrect and sets "1" in the DMA register 4 in all the cells corresponding to PDL or SDL in the DMAi. Finally, the program counts the number of defectless DMAs, and compares the number with a predetermined number K2. If the counted number is equal to the predetermined number K2, it is determined that the disk can be used for reading, but can not be used for writing. If the counted number is greater than the predetermined number K2, it is determined that the disk has no problem and can be used for both reading and writing. If the counted number is lower than a predetermined number K2, it is determined that the disk itself is in error. In this case the program goes to step (704).
(704) The micro controller 1 reports to the host computer 9 that the number of defectless DMAs is less than the allowed number, and indicates disk error.

Referring to FIG. 7b, a detail of step (702) for reading the data in DMAi is shown.
(710) The data stored in the sectors for DMA1 is read.
(711) The data stored in the sectors for DMA2 is read.
(712) The data stored in the sectors for DMA3 is read.
(713) The data stored in the sectors for DMA4 is read.

Figure 7C:
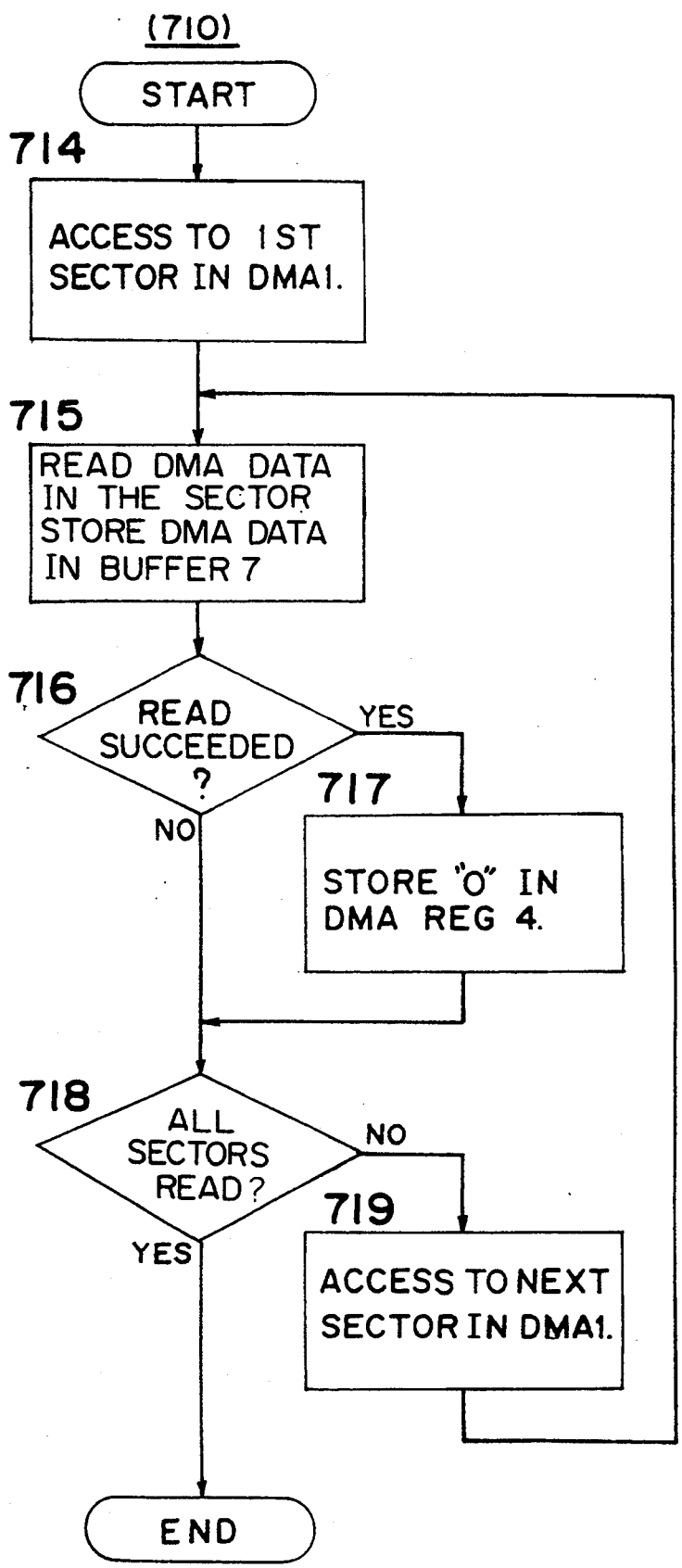
FIG. 7c is a flow chart showing a detail of step 710 shown in FIG. 7b.
Figure 7E:
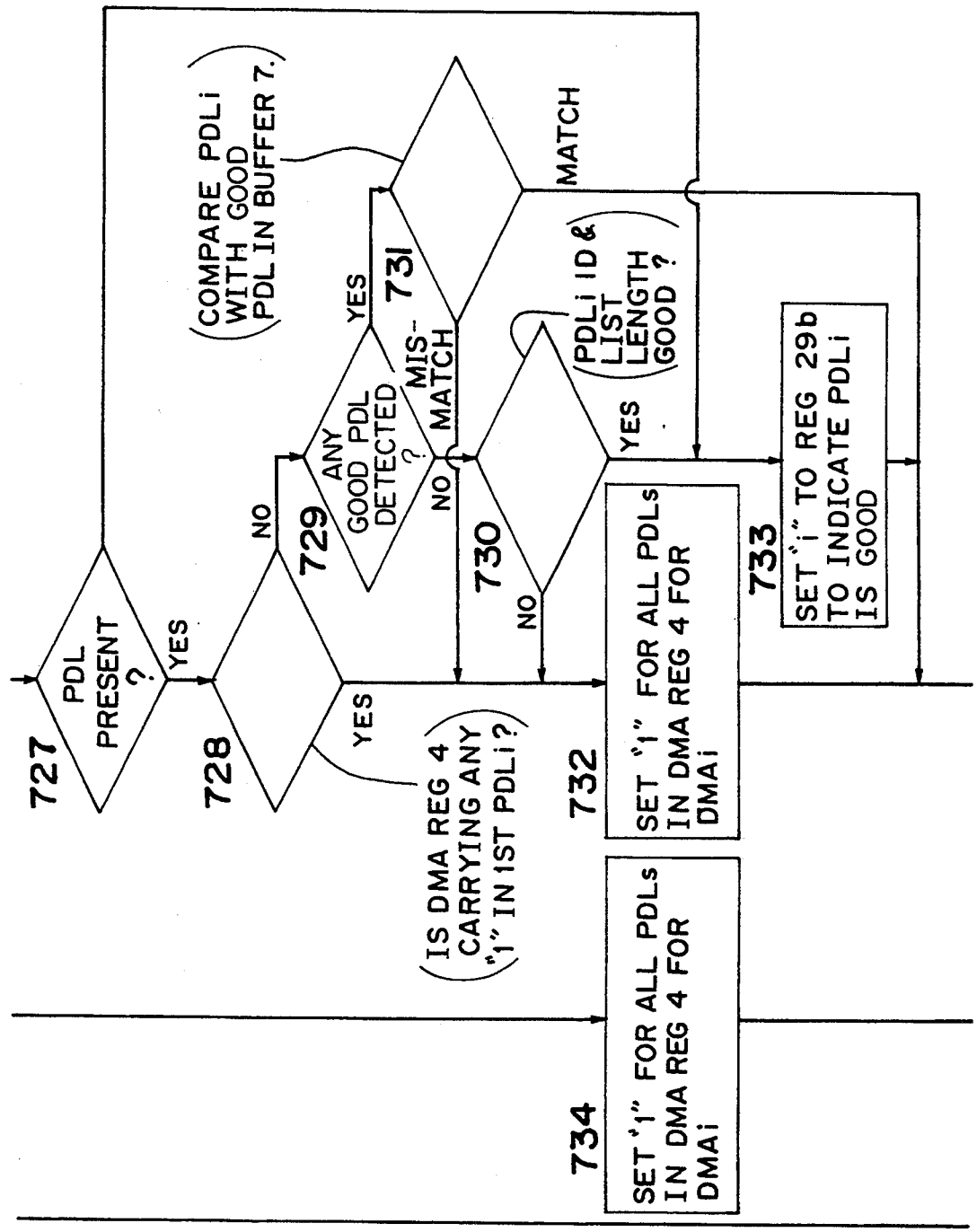
Figure 7F:
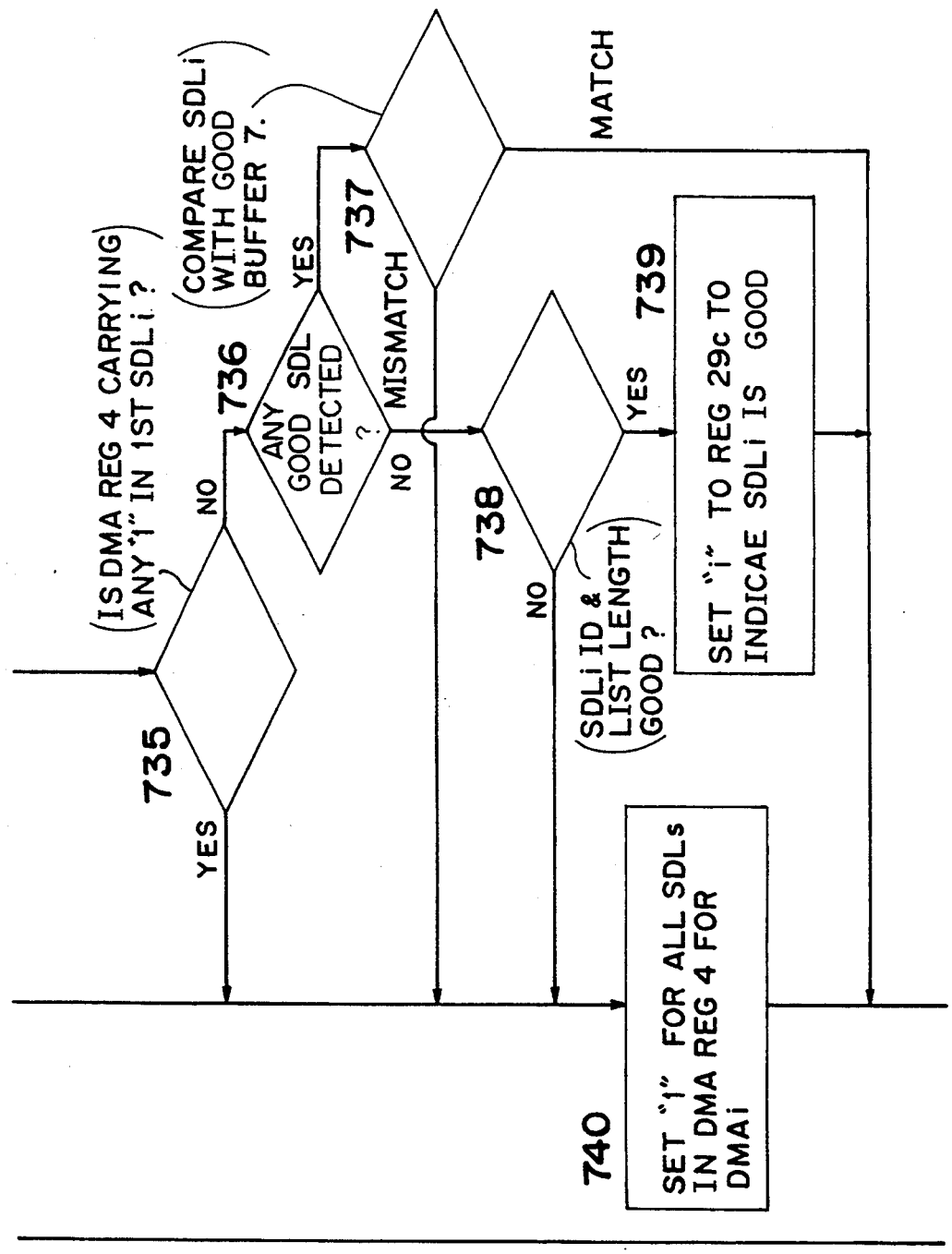
Figure 7G:
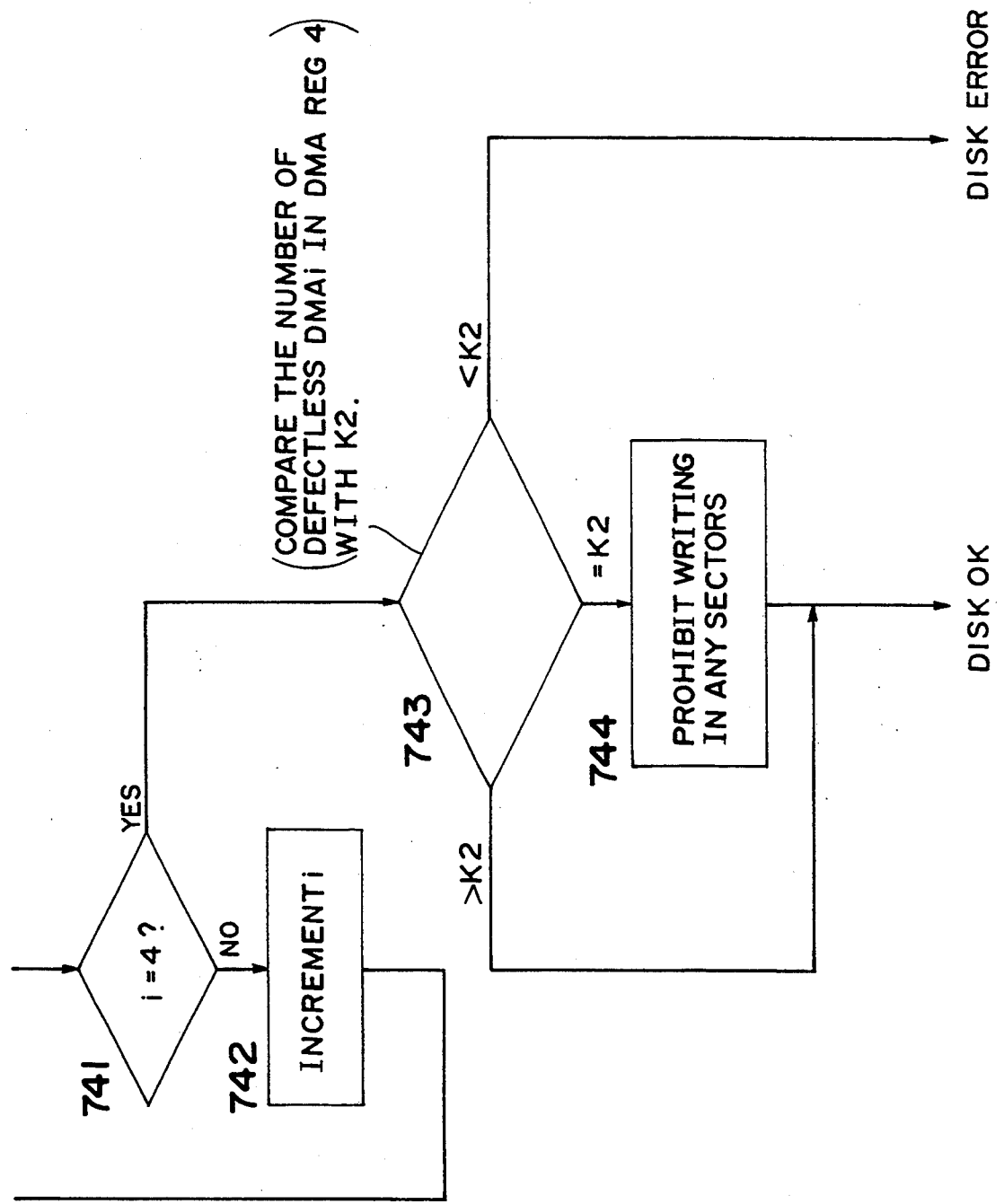

Referring to FIG. 7c, a detail of step (710) is shown.
(714) An access is made to the first sector in the DMA1 in the optical disk.
(715) The data stored in the accessed sector is read and stored in DMA data buffer 7.
(716) It is detected whether or not the data reading is successfully completed.
(717) If the data reading is successful, the accessed sector is determined as a defectless sector. Micro controller 1 makes DMA register 4 store "0" in the cell corresponding to the accessed sector to indicate that the accessed sector is a good sector.

(718) It is detected whether or not all the sectors in the DMA1 are accessed.

(719) An access is made to the next sector in DMA1.

Referring to FIGS. 7d to 7g, taken together as shown in FIG. 7h, a detail of step (703) for checking the DMA-1–DMA4 is shown.

(720) The DMA1–DMA4 are read from the sectors in the optical disk and are written in the DMA data buffer 7. Also, during the reading procedure, each sector in the DMA1–DMA4 is examined and the DMA register is filled with flags "0" and/or "1" representing the condition of the examined sectors. In this step, the cells 29a, 29b and 29c of the temporary register 29 are reset to (0,0,0) to indicate that the good DDS, PDL and SDL areas have not been detected yet.

(721) An access is made to the DMAi, wherein i=1 for checking.

(722) It is detected whether or not the DMA register 4 is carrying "1" in DDSi. (Here, the suffix "i" added to the DDS is to indicate that the DDSi belongs to the DMAi. The same is said to PDLi and SDLi.) In other words, it is checked whether the sector carrying DDSi for the accessed DMAi is a defectless sector, or not. If the sector carrying DDSi is a defectless sector, the program goes to step (723), and if not, the program goes to step (734).

(723) It is detected whether or not any DDS has been checked as a good DDS, previously, by checking the number carried in the cell 29a for the DDS in the temporary register 29. If the cell 29a is carrying "0", the program goes to step (724), and if the cell 29a is carrying a number other than "0", e.g., "1", "2" or "3", the program goes to step (725). In the first cycle, since the cell 29a is carrying "0", it is understood that no DDS has been checked as a good DDS. Therefore, in the first cycle, the procedure always goes to step (724).

(724) The data in the present DDSi is examined to find if the partition information is good. If the partition information is good, the program goes to step (726), but if not, the program goes to step (734).

(725) The present DDSi is compared with the previously checked DDS which is determined as an appropriate DDS. The present DDSi and the previously checked DDS are stored in the DMA data buffer 7. If the major portion of the present DDSi is the same as that of the previously checked DDS, the program goes to step (727). On the contrary, if the major portion of the present DDSi is different from that of the previously checked and corrected DDS, the program goes to step (734).

(726) Since the partition information is found good, "i" (in the first cycle i−1) is set in the temporary register 29a to indicate that DDSi is checked and is carrying appropriate information.

(727) It is detected whether or not the PDL is present. In some format, the PDL is omitted. If yes, the program goes to step (728), and if no, the program goes to step (733).

(728) It is detected whether or not the DMA register 4 is carrying "1" for the first sector of the PDLi. In other words, it is checked whether the sector carrying PDLi for the accessed DMAi is a defectless sector, or not. If the sector carrying PDLi is a defectless sector, the program goes to step (729), and if not, the program goes to step (732).

(729) It is detected whether or not any PDL has been checked as a good PDL, previously, by checking the number carried in the cell 29b for the PDL in the temporary register 29. If the cell 29b is carrying "0", the program goes to step (730), and if the cell 29b is carrying a number other than "0" e.g., "1", "2" or "3", the program goes to step (731). In the first cycle, since the cell 29b is carrying "0", it is understood that no PDL has been checked as a good PDL. Therefore, in the first cycle, the procedure always goes to step (730).

(730) The data in the present PDLi is examined to find if the ID code and the list length data are good. If such data are good, the program goes to step (733), but if not, the program goes to step (732).

(731) The present PDLi is compared with the previously checked PDL which is determined as an appropriate PDL. The present PDLi and the previously checked PDL are stored in DMA data buffer 7. If the major portion of the present PDLi is the same as that of the previously checked PDL, the program goes to step (735). On the contrary, if the major portion of the present PDLi is different from the previously checked and corrected PD1, the program goes to step (732).

(732) Since it is detected that one or more sectors carrying PDLi data are not defectless sectors, the PDL data for this DMAi has poor reliability. Thus, to prevent the use of PDL data from this DMAi, other sectors carrying PDLi are forcibly made defect sectors by adding "1" to all the cells of the PDL of the DMAi in the DMA register 4.

(733) Since the ID code and the list length data are found good, "i" (in the first cycle i=1) is set in the temporary register 29b to indicate that PDLi is checked and is carrying appropriate information.

(734) The sectors for carrying PDLi are forcibly made defect sectors by adding "1" to all the cells for the PDL of the DMAi in the DMA register 4.

(735) It is detected whether or not the DMA register 4 is carrying "1" for the first sector of the SDLi. In other words, it is checked whether the sector carrying SDLi for the accessed DMAi is a defectless sector, or not. If the sector carrying SDLi is a defectless sector, the program goes to step (736), and if not, the program goes to step (740).

(736) It is detected whether or not any SDL has been checked as a good SDL, previously, by checking the number carried in the cell 29c for the SDL in the temporary register 29. If the cell 29c is carrying "0", the program goes to step (738) and if the cell 29c is carrying a number other than "0", e.g., "1", "2" or "3", the program goes to step (737). In the first cycle, since the cell 29c is carrying "0", it is understood that no SDL has been checked as a good SDL. Therefore, in the first cycle, the procedure always goes to step (738).

(737) The present SDLi is compared with the previously checked SDL which is determined as an appropriate SDL. The present SDLi and the previously checked SDL are stored in DMA data buffer 7. If the major portion of the present SDLi is the same as that of the previously checked SDL, the program goes to step (741). On the contrary, if the major portion of the present SDLi is different from the previously checked and corrected SDL, the program goes to step (740).

(738) The data in the present SDLi is examined to find if the ID code and the list length data are good. If such data are good, the program goes to step (739), but if not, the program goes to step (740).

(739) Since the ID code and the list length data are found good, "i" (in the first cycle i=1) is set in the temporary register 29c to indicate that SDLi is checked and is carrying appropriate information.

(740) The sectors for carrying SDLi are forcibly made defect sectors by adding "1" to all the cells of the SDL of the DMAi in the DMA register 4.

(741) It is detected whether i−4, or not. If not, the program goes to step (742) but if yes, the program goes to step (743).

(742) Since "i" has not yet reached "4", "i" is incremented and the program returns to step (722) to check the next DMAi.

(743) The number of defectless DMAi is detected. The defectless DMAi is the DMA in DMA register 4 which has no "1" presented in any cells for DDS, PDL and SDL. For example, according to the example shown in FIG. 4, the DMA2 and DMA4 can be considered as defectless DMA because the cells are all filled with "0" indicating good sectors. The detected number of the defectless DMAi is compared with a predetermined number K2. If the detected number is less than K2, it is so determined that the optical disk itself has a defect and that further writing and reading are prohibited. If the detected number is equal to K2, it is so determined that the optical disk is acceptable, but can only be used for reading. In this case, the program goes to step (744). If the detected number is less than K2, it is so determined that the optical disk is good to permit both the reading and writing of the data.

(744) The micro controller 1 prohibits the writing of any data in any sectors in the optical disk.

By the procedure explained above, the program executes the data reading, writing, checking and erasing processes with respect to four DMA areas. As apparent from the above, the program assumes that the all the DMA is incorrect at step (734) when the DDS is incorrect or has unreliable information. In addition, the program assumes that all the PDL or SDL is incorrect when the ID code or the list length data recorded in the PDL or SDL area is incorrect or unreliable. As a result, it is possible to prevent incorrect data to be read out from the DMA having the information incorrectly recorded even when the data writing processing is stopped intermediately due to a failure of an electric power supply before the completion of the processing. Accordingly, it is possible to read PDL or SDL in high reliability from the DMAs.

For example, in the prior art formatting system wherein the four DMA areas are erased and renewed one at a time, there is such a possibility that old DMA data may be carried over if the power failure occurs before completing the formatting. In this case, the data carried in some DMAs are not inconsistent with the data carried in other DMAs. However, according to the present invention as described above, even if such a disk with inconsistent DMA data is loaded, it is possible to disregard the old DMA data and use only the renewed DMA data having a high reliability.

When there is, for example, one SDL including the incorrect sectors at the step (735), the micro controller 1 sets a write protect flag thereto in a similar way to that of a case when a write protect tab formed on a disk cartridge is sets to a protect state to inhibit all of the data write processing in the disk. When only one DMA area has correct data recorded thereon, all the SDL are made incorrect when the SDL renewal operation is unexpectedly terminated by the power failure during the data write operation. Accordingly, the disk with no correct SDL is recorded in the DMAs, it is impossible to execute the linear replacement that is defect sector management method, resulting in improper reading of the disk. In such a case where only one correct SDL is recorded, the data writing processing is inhibited to prevent the generation of the serious error caused by the linear replacement.

Referring to FIG. 8a a flow chart for the normal data writing is shown.

(801) The normal data to be stored in the rewritable area and the sector address for storing such data are received from host computer 8.

(802) The data previously stored in the sectors with the received address are erased. During the erasing, if any defect sectors are detected, the address of such defect sectors and the address of substitute sectors for replacing the data are stored in the SDL as new entries in DMA data buffer 7.

(803) The normal data is written in the sectors designated by the received address. During the writing, if any defect sectors are detected, the address of such defect sectors and the address of substitute sectors for replacing the data are stored in the SDL as new entries in DMA data buffer 7.

(804) It is detected whether or not any new entry is added in the SDL in DMA data buffer 7. If some new entries are added, the program goes to step (805), but if not, the program ends.

(805) The suffix "i" for designating one of four DMAs is reset to "1".

(806) The DMAs in the disk are renewed by the data stored in the DMA data buffer 7, and the SDL data for DMAi in the DMA register 4 is renewed. The detail of this step is further explained later.

(807) The number of DMAs that have no defective sectors is detected. The detected number of defectless DMAs is compared with a predetermined number K3. If the defectless DMA number is less than K3, it is so determined that the optical disk itself has a defect and that further writing and reading are prohibited. In this case, the program goes to step (810). If the number of defectless DMAs is equal to or greater than K3, it is so determined that the optical disk is acceptable. In this case, the program goes to step (808).

(808) It is detected whether i=4, or not. If not, the program goes to step (809) and if yes, the program ends.

(809) The suffix "i" is incremented.

(810) It is so determined that the disk itself has an error.

Figure 8B:
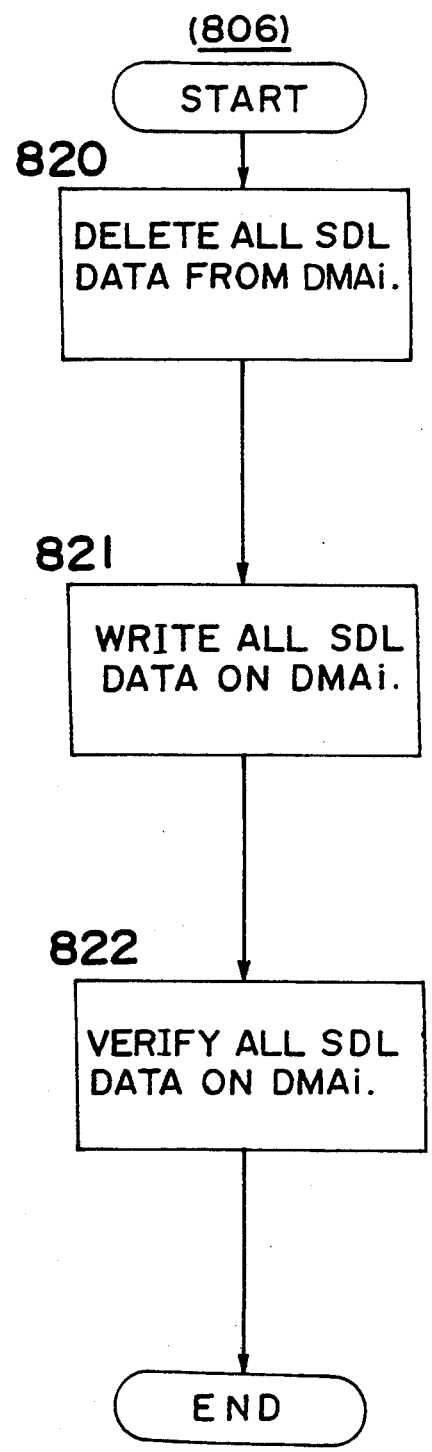

Referring to FIG. 8b, a detail of step (806) is shown.

(820) All the SDL data are deleted from DMAi in the disk.

(821) Renewed SDL data for DMAi are written from DMA data buffer 7 to corresponding sectors in the disk.

(822) The new SDL data are verified.

Figure 8C:
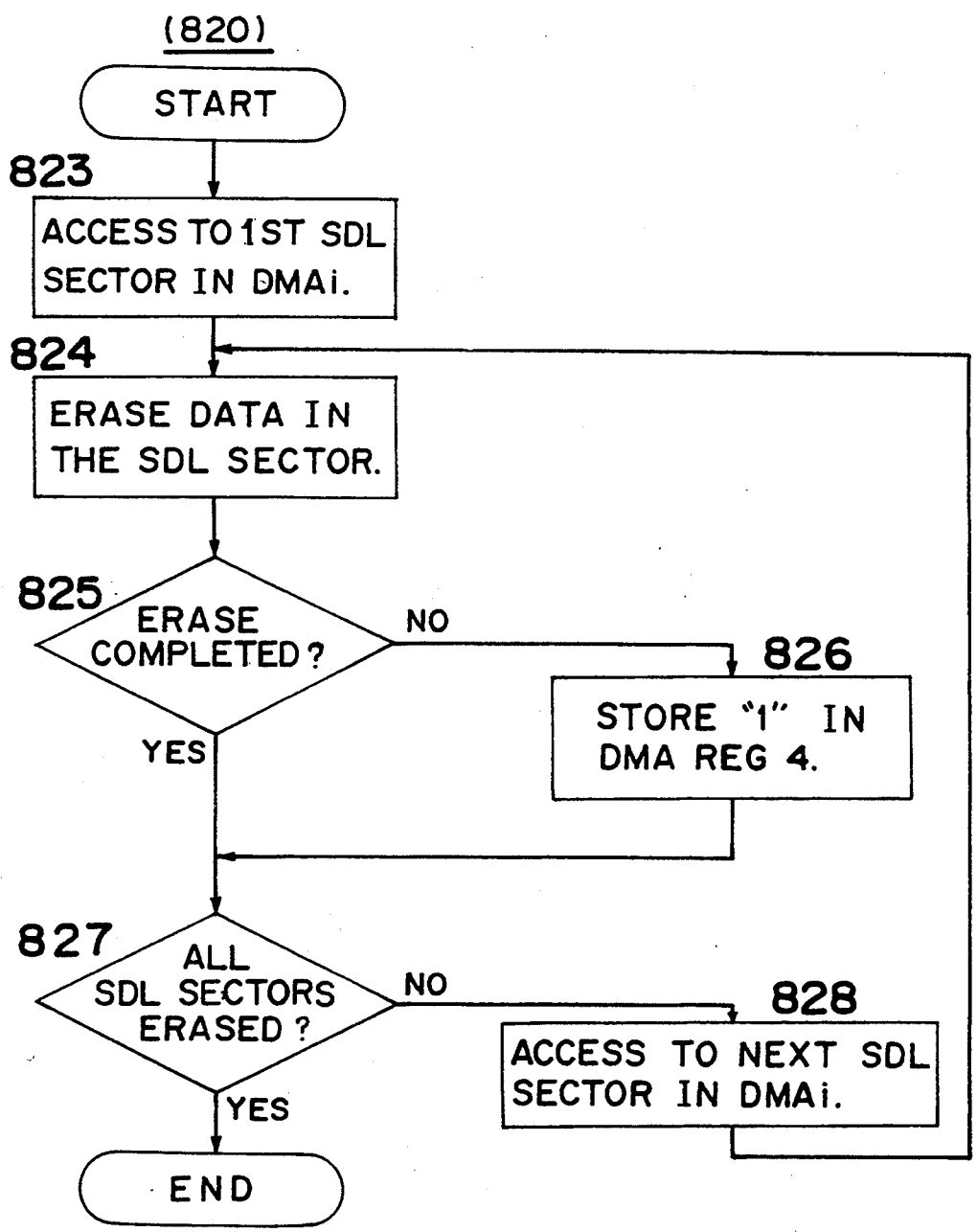
FIG. 8c is a flow chart showing a detail of step 820 shown in FIG. 8b.

Referring to FIG. 8c, a detail of step (820) for erasing the data in SDL sectors is shown.

(823) An access is made to the first sector in the DMAi area.

(824) The data in the SDL sector for the DMAi is erased.

(825) It is detected whether or not the data erasing is successfully completed.

(826) If the data erase is not successful, the accessed sector is determined to be a bad sector. Thus, the micro controller 1 sets "1", indicating a bad sector, to a cell corresponding to the accessed sector in the DMA management register 4.

(827) It is detected whether or not all the SDL sectors in the DMAi are erased.

(828) An access is made to the next sector in the DMAi area.

Referring to FIG. 8d, a detail of step (821) for writing new SDL data in the sectors is shown.

(829) An access is made to the first sector in the DMAi area.

(830) The data for the DMAi as stored in DMA data buffer 7 is written to the DMAi area.

(831) It is detected whether or not the data write is successfully completed.

(832) If the data write is not successful, the accessed sector is determined to be a bad sector. Thus, the micro controller 1 sets "1", indicating a bad sector, to a cell corresponding to the accessed sector in the DMA management register 4.

(833) It is detected whether or not all the data from the DMA data buffer 7 are written to the corresponding DMAi area in the optical disk.

(834) An access is made to the next sector in the DMA1 area.

Figure 8E:
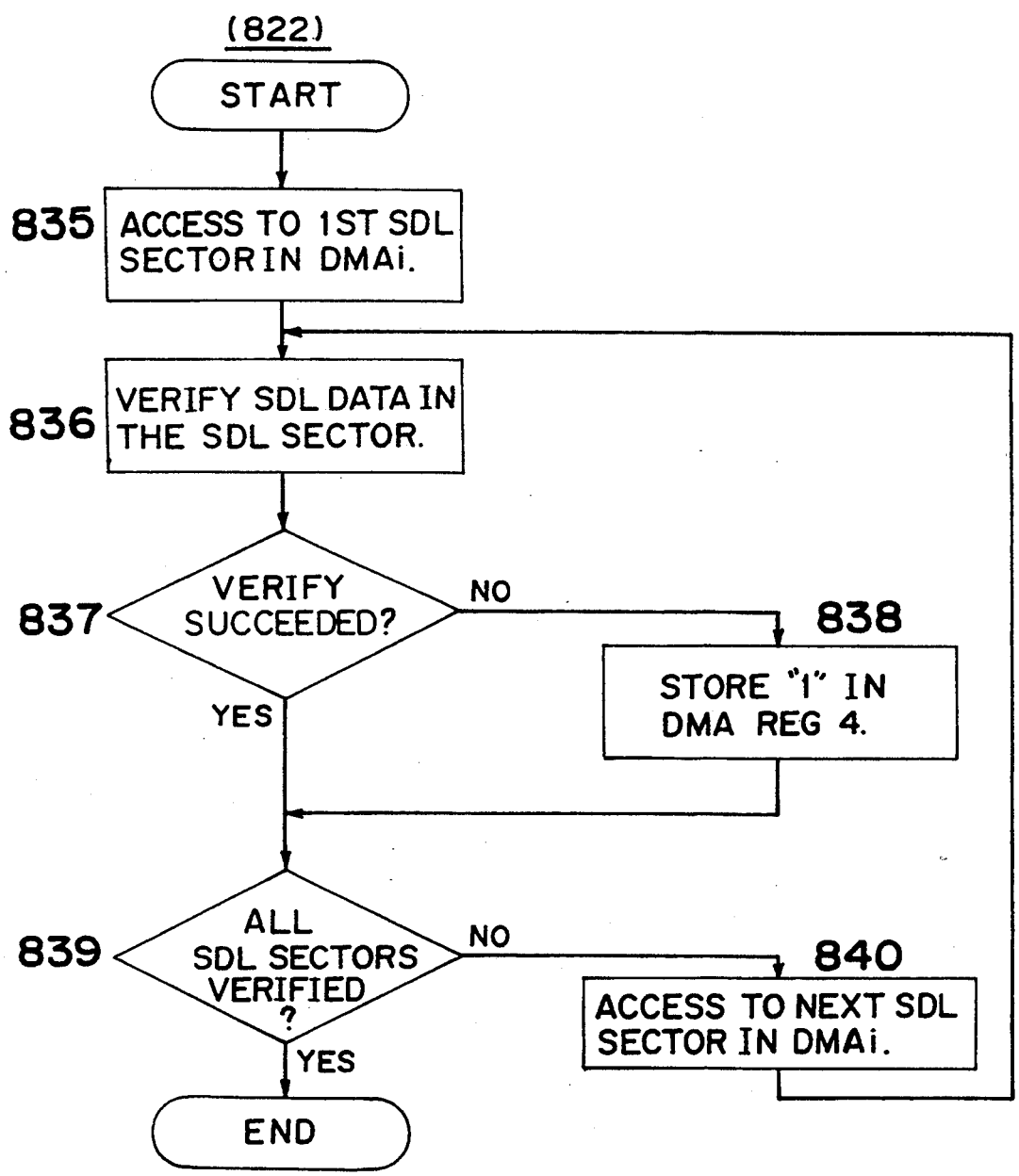
FIG. 8e is a flow chart showing a detail of step 822 shown in FIG. 8b.

Referring to FIG. 8e, a detail of step (822) for verifying the renewed SDL sectors is shown.

(835) An access is made to the first sector in the DMAi area.

(836) The SDL data in the accessed sector is verified.

(837) It is detected whether or not the verification is successfully completed.

(838) If the verification is not successful, the accessed sector is determined to be a bad sector. Thus the micro controller 1 sets "1", indicating a bad sector, to a cell corresponding to the accessed sector in the DMA register 4.

(839) It is detected whether or not all SDL sectors in DMAi are verified.

(840) An access is made to the next sector in the DMAi area.

According to the embodiment shown in FIGS. 8a to 8e, since the SDL data in DMAi are erased completely and, is then written with renewed SDL data from DMA data buffer 7, at least one SDL, which may be old data or renewed data, remains in the optical disk. Where processing is stopped intermediately due to failure of a power supply prevents the serious error of losing all of the SDL data.

Figure 9:
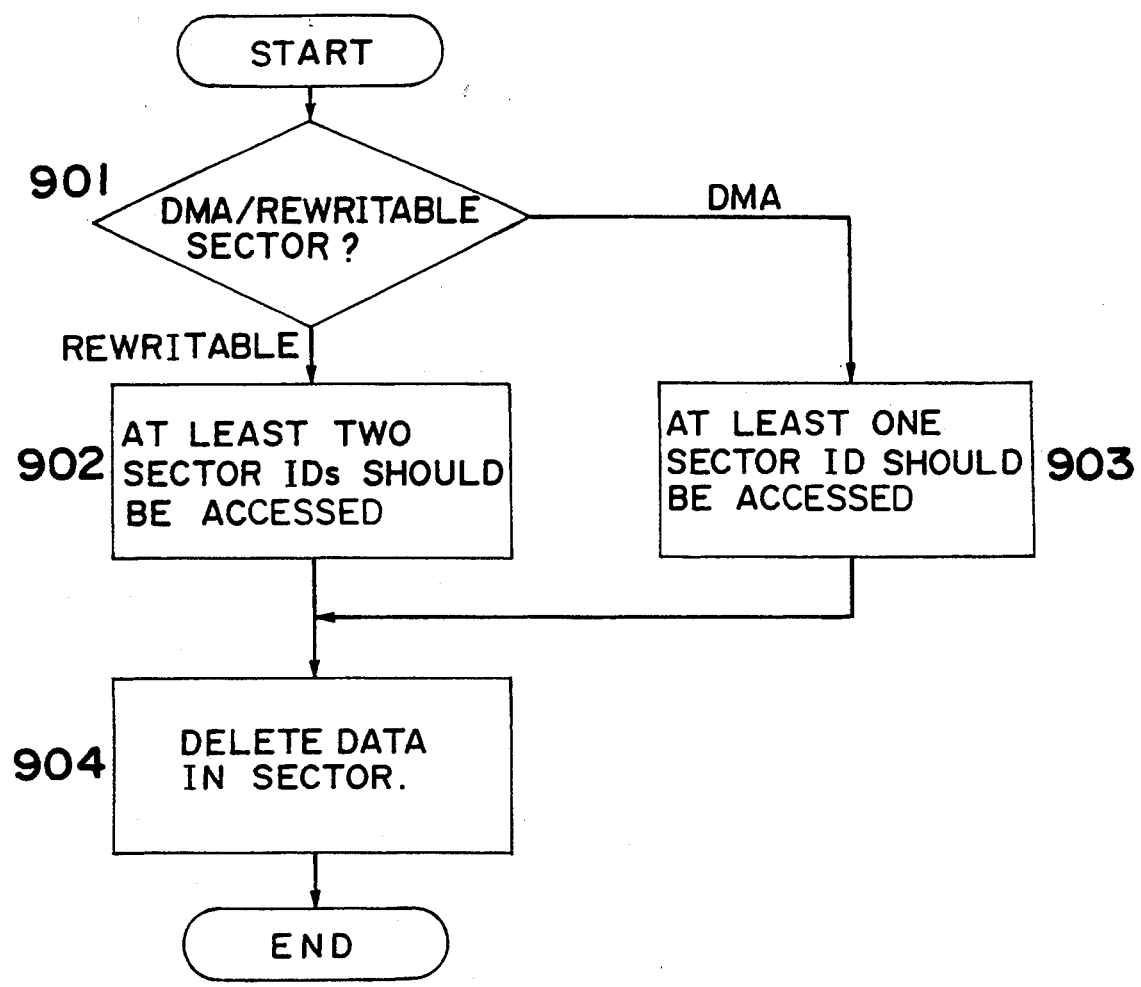
FIG. 9 is a flow chart showing an operation for setting security degree for deleting sectors.

Referring to FIG. 9, a flow chart for setting two different modes, high and low confirmation modes, allowing access to the sectors for erasing the sectors, is shown. As shown in FIG. 10, at the beginning of each sector, there are three ID codes provided for the failsafe purpose. In the high confirmation mode, a greater number of ID codes should be acknowledged before having access to the target sector, and in the low confirmation mode, a fewer number of ID codes is needed to be acknowledged before having access.

(901) It is detected whether or not the sector to be accessed is the sector in the DMA or the sector in the rewritable area.

(902) When the sector to be accessed is in the rewritable area, the number of ID codes to be acknowledged is set to two. In this case, the high confirmation mode is set.

(903) When the sector to be accessed is in the DMA, the number of ID codes to be acknowledged is set to one. In this case, the low confirmation mode is set.

(904) The erasing procedure is carried out for the accessed sector.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information writing and reading apparatus for writing and reading data on a recording disk having a plurality of rewritable sectors for storing normal data and a plurality of DMA sectors for storing defect management data repeatedly in a plurality of DMAs (Defect Management Areas), said information writing and reading apparatus comprising:
   DMA sector condition storing means for storing condition data representing the condition of sectors in said DMAs;
   erasing means for erasing data in said recording disk by a sector; and
   control means for controlling such that after one DMA sector is erased by said erasing means, a condition of said one DMA sector is examined whether it is a defectless sector or a defect sector, and a flag representing the examined result is stored in said DMA sector condition storing means.

2. An information writing and reading apparatus for writing and reading data on a recording disk having a plurality of rewritable sectors for storing normal data and a plurality of DMA sectors for storing defect management data repeatedly in a plurality of DMAs (Defect Management Areas), said information writing and reading apparatus comprising:
   DMA sector condition storing means for storing condition data representing the condition of sectors in said DMAs;
   writing means for writing data in said recording disk by a sector; and
   control means for controlling such that after one DMA sector is written by said writing means, a condition of said one DMA sector is examined whether it is a defectless sector or a defect sector, and a flag representing the examined result is stored in said DMA sector condition storing means.

3. An information writing and reading apparatus for writing and reading data on a recording disk having a plurality of rewritable sectors for storing normal data and a plurality of DMA sectors for storing defect management data repeatedly in a plurality of DMAs (Defect Management Areas), said information writing and reading apparatus comprising:
   DMA sector condition storing means for storing condition data representing the condition of sectors in said DMAs;
   reading means for reading data in said recording disk by a sector; and
   control means for controlling such that after one DMA sector is read by said reading means, a condition of said one DMA sector is examined whether it is a defectless sector or a defect sector, and a flag representing the examined result is stored in said DMA sector condition storing means.

4. An information writing and reading apparatus for writing and reading data on a recording disk having a plurality of rewritable sectors for storing normal data and a plurality of DMA sectors for storing defect management data repeatedly in a plurality of DMAs (Defect Management Areas), said information writing and reading apparatus comprising:

DMA sector condition storing means for storing condition data representing the condition of sectors in said DMAs;

erasing means for erasing data in said recording disk by a sector;

writing means for writing data in said recording disk by a sector;

reading means for reading data in said recording disk by a sector;

control means for controlling such that after one DMA sector is processed by any one of said erasing means, writing means and reading means, a condition of said one DMA sector is examined whether it is a defectless sector or a defect sector, and a flag representing the examined result is stored in said DMA sector condition storing means.

5. An information writing and reading apparatus for writing and reading data on a recording disk having a plurality of rewritable sectors for storing normal data and a plurality of DMA sectors for storing defect management data repeatedly in a plurality of DMAs (Defect Management Areas), said information writing and reading apparatus comprising:

DMA sector condition storing means for storing condition data representing the condition of sectors in said DMAs;

DMA data buffer means for temporarily storing the DMA sector data;

erasing means for erasing data in said recording disk by a sector;

writing means for writing data in said recording disk by a sector;

reading means for reading data in said recording disk by a sector;

control means for controlling said erasing means, writing means and reading means to carry out formatting of said recording disk such that: each said DMA sector is erased by said erasing means; that after each erase, a condition of each said DMA sector is examined whether it is a defectless sector or a defect sector, and a flag representing the examined result is stored in said DMA sector condition storing means; that a frame of said DMA is temporarily formed and stored in said DMA data buffer means; that said reading means reads said rewritable sectors for verification to detect rewritable sectors with defects; that addresses of said defect sectors are stored as DMA data in said DMA data buffer means; that said writing means writes said DMA data on said DMA sectors; that after each writing on said DMA sector, a condition of each said DMA sector is examined whether it is a defectless sector or a defect sector, and a flag representing the examined result is stored in said DMA sector condition storing means; and that format error is indicated when a number of defectless DMA as recorded in said DMA sector condition storing means is less than a first predetermined number.

6. An information writing and reading apparatus according to claim 5, wherein said control means controls said erasing means to erase data in the DMA sectors by writing a dummy data when said recording disk is of an overwrite type.

7. An information writing and reading apparatus according to claim 5, wherein said control means controls said erasing means to erase data in the DMA sectors when a predetermined number of sector ID codes are detected, said predetermined number being less than a number of sector ID codes necessary to detect when erasing data in the rewritable sectors.

8. An information writing and reading apparatus according to claim 5, wherein said first predetermined number is variable.

9. An information writing and reading apparatus for writing and reading data on a recording disk having a plurality of rewritable sectors for storing normal data and a plurality of DMA sectors for storing defect management data repeatedly in a plurality of DMAs (Defect Management Areas), said defect management data comprising DDS (Disk Definition Structure) data, PDL (Primary Defect List) data having PDL ID code and PDL length data, and SDL (Secondary Defect List) data having SDL ID code and SDL length data, said information writing and reading apparatus comprising:

DMA sector condition storing means for storing condition data representing the condition of sectors in said DMAs;

DMA data buffer means for temporarily storing the DMA sector data;

reading means for reading data in said recording disk by a sector;

temporary register means for storing data indicating a checked condition of each of said DDS data, PDL data and SDL data;

control means for controlling such that: said reading means reads said defect management data in said plurality of DMAs; that said DDS data is checked whether it is appropriate or not; that said defect management data itself is indicated as incorrect when said DDS data is checked as not appropriate; that said PDL data is checked whether its PDL ID code and PDL length data are appropriate or not; that said PDL data is indicated as incorrect when at least either one of said PDL ID code and PDL length data is checked as not appropriate; that said SDL data is checked whether its SDL ID code and SDL length data are appropriate or not; and that said SDL data is indicated as incorrect when at least either one of said SDL ID code and SDL length data is checked as not appropriate.

10. An information writing and reading apparatus according to claim 9, wherein said control means further controls such that a disk error is indicated when a number of defectless DMA as recorded in said DMA sector condition storing means is less than a second predetermined number.

11. An information writing and reading apparatus according to claim 9, wherein said control means further controls such that a data writing on said recording disk is prohibited when a number of defectless DMA as recorded in said DMA sector condition storing means is equal to a second predetermined number.

12. An information writing and reading apparatus according to claim 9, wherein said control means further controls such that said DDS data checked as appropriate for the first time is compared with the following DDS data, and that the following DDS data is indicated as incorrect when the following DDS data has a major portion which is different from a major portion in said first checked DDS data.

13. An information writing and reading apparatus according to claim 9, wherein said control means further controls such that said PDL data checked as appropriate for the first time is compared with the following PDL data, and that the following PDL data is indicated as incorrect when the following PDL data has a major portion which is different from a major portion in said first checked PDL data.

14. An information writing and reading apparatus according to claim 9, wherein said control means further controls such that said SDL data checked as appropriate for the first time is compared with the following SDL data, and that the following SDL data is indicated as incorrect when the following SDL data has a major portion which is different from a major portion in said first checked SDL data.

15. An information writing and reading apparatus for writing and reading data on a recording disk having a plurality of rewritable sectors for storing normal data and a plurality of DMA sectors for storing defect management data repeatedly in a plurality of DMAs (Defect Management Areas), said defect management data comprising DDS (Disk Definition Structure) data, PDL (Primary Defect List) data having PDL ID code and PDL length data, and SDL (Secondary Defect List) data having SDL ID code and SDL length data, said information writing and reading apparatus comprising:
- DMA sector condition storing means for storing condition data representing the condition of sectors in said DMAs;
- DMA data buffer means for temporarily storing the DMA sector data;
- erasing means for erasing data in said recording disk by a sector;
- writing means for writing data in said recording disk by a sector; control means for controlling such that after a rewritable sector is processed by any one of said erasing means and writing means, a condition of said rewritable sector is examined whether it is a defectless sector or a defect sector, and when a defect sector is detected, an address of the defect sector and an address of a substitute sector for replacing the data are stored in SDL as a new entry, and that a disk error is indicated when a number of defectless SDL is less than a third predetermined number.

16. An information writing and reading apparatus according to claim 15, wherein said control means controls said erasing means to erase data in the DMA sectors when a predetermined number of sector ID codes are detected, said predetermined number being equal to a number of sector ID codes necessary to detect when reading data in the rewritable sectors.

17. An information writing and reading apparatus according to claim 15, wherein said third predetermined number is variable.

* * * * *

UNITED STATES PATENT AND TRADEMARK OFFICE
CERTIFICATE OF CORRECTION

PATENT NO. : 5,404,357
DATED : April 4, 1995
INVENTOR(S) : Ito et al.

It is certified that error appears in the above-identified patent and that said Letters Patent is hereby corrected as shown below:

Column 19, line 16, after "sector;" insert --and--.

Column 19, line 43, after "sector;" insert --and--.

Column 19, line 47, after "means;" delete "that".

Column 19, line 52, after "means;" delete "that".

Column 19, line 54, after "means;" delete "that".

Column 19, line 56, after "defects;" delete "that".

Column 19, line 54, after "means;" delete "that".

Column 19, line 58, after "means;" delete "that".

Column 19, line 59, after "sectors;" delete "that".

Column 19, line 64, after "and" delete "that".

Column 20, line 36, after "data" insert --and--.

Column 20, line 39, after "DMAs;" delete "that".

UNITED STATES PATENT AND TRADEMARK OFFICE
CERTIFICATE OF CORRECTION

PATENT NO.    : 5,404,357
DATED         : April 4, 1995
INVENTOR(S)   : Ito et al.

It is certified that error appears in the above-identified patent and that said Letters Patent is hereby corrected as shown below:

Column 20, line 40, after "not;" delete "that".

Column 20, line 40, after "not;" delete "that".

Column 20, line 43, before "said" delete "that".

Column 20, line 45, before "said" delete "that."

Column 20, line 47, after "appropriate;" delete "that".

Column 20, line 49, after "and" delete "that".

Column 21, line 1, after "and" delete "that".

Column 21, line 10, after "and" delete "that".

Column 21, line 19, after "and" delete "that".

Column 22, line 11, after "sector;" insert --and--.

Column 22, line 11, the word "control" starts a new paragraph.

UNITED STATES PATENT AND TRADEMARK OFFICE
CERTIFICATE OF CORRECTION

PATENT NO. : 5,404,357
DATED : April 4, 1995
INVENTOR(S) : Ito, et. al.

It is certified that error appears in the above-indentified patent and that said Letters Patent is hereby corrected as shown below:

Column 22, line 19, after "and" delete "that".

Signed and Sealed this

Twenty-sixth Day of September, 1995

Attest:

BRUCE LEHMAN

Attesting Officer     Commissioner of Patents and Trademarks